United States Patent [19]
Yokoi

[11] Patent Number: 5,764,245
[45] Date of Patent: Jun. 9, 1998

[54] RECORDING APPARATUS AND RECORDING METHOD

[75] Inventor: Katsuyuki Yokoi, Yokohama, Japan

[73] Assignee: Canon Kabushiki Kaisha, Tokyo, Japan

[21] Appl. No.: 416,654

[22] Filed: Apr. 5, 1995

[30] Foreign Application Priority Data

| Apr. 5, 1994 | [JP] | Japan | 6-067102 |
| Mar. 30, 1995 | [JP] | Japan | 7-073216 |

[51] Int. Cl.⁶ .................................................. B41J 29/38
[52] U.S. Cl. ............................ 347/16; 347/139; 347/164; 347/264; 399/374
[58] Field of Search ........................... 347/16, 139, 164, 347/218, 262, 264; 271/225, 304, 186, 187, 72; 399/306, 309, 364, 374

[56] References Cited

U.S. PATENT DOCUMENTS

| 4,313,124 | 1/1982 | Hara | 346/140 R |
| 4,345,262 | 8/1982 | Shirato et al. | 346/140 R |
| 4,453,841 | 6/1984 | Babick et al. | 400/126 |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,591,884 | 5/1986 | Miyamoto et al. | 345/153.1 |
| 4,608,577 | 8/1986 | Hori | 346/140 R |
| 4,723,129 | 2/1988 | Endo et al. | 346/1.1 |
| 4,740,796 | 4/1988 | Endo et al. | 346/1.1 |
| 5,133,541 | 7/1992 | Murasaki et al. | 271/176 |
| 5,447,303 | 9/1995 | Smith | 271/291 |
| 5,448,348 | 9/1995 | Azeta | 355/419 |
| 5,449,160 | 9/1995 | Hou et al. | 271/3.15 |
| 5,517,228 | 5/1996 | Obu et al. | 347/171 |

FOREIGN PATENT DOCUMENTS

| 54-56847 | 5/1979 | Japan . |
| 59-123670 | 7/1984 | Japan . |
| 59-138461 | 8/1984 | Japan . |
| 60-71260 | 4/1985 | Japan . |
| 61-154865 | 7/1986 | Japan . |

*Primary Examiner*—David M. Gray
*Assistant Examiner*—John Chizmar
*Attorney, Agent, or Firm*—Fitzpatrick, Cella, Harper & Scinto

[57] ABSTRACT

A recording apparatus comprises a carriage for holding a recording head for recording on a recording medium; a platen positioned opposite to the recording head for supporting the recording medium at a recording area; a conveying device rotatable for introducing the recording medium into the recording area; a passage for introducing, after the recording medium passes the recording head, the recording medium into the conveying device by rendering a lower end of the recording medium as a front end in a conveyance direction; and a line buffer memory for temporarily storing serial recording data of one scanning line of the recording head, the recording data being expandable to H stages and M columns. The recording apparatus is actuated in a double side recording mode; the recording means records one side of the recording medium; after making the recording medium pass through the passage and be set at a recording commencement position for the other side thereof, the recording medium is conveyed in a forward conveyance direction to render an upper end of the recording medium as a front end in a reverse conveyance direction by rotating the conveying device; and the recording medium is conveyed in the reverse conveyance direction and the recording head records on the other side of the recording medium by transmission from the line buffer memory to the recording head the serial recording data reversely permuted so that data at the H stage and the M column constitute data at the first stage and the first column.

33 Claims, 22 Drawing Sheets

RECORDING APPARATUS AND RECORDING METHOD

BACKGROUND OF THE INVENTION

1. Field of the Invention

This invention relates to a recording apparatus and recording means for recording on recording media and, for example, to a recording apparatus (printer) as an information output apparatus for a computer or the like and to a recording apparatus and recording means as a recording system in an image forming apparatus such as a photocopier and a facsimile machine.

2. Description of Related Art

Conventionally, so called serial type recording apparatuses in which recording is made by scanning recording means and recording media in main and sub scanning directions, respectively, have been constituted as shown in FIG. 21. FIG. 21 is a crosswise cross-sectional view showing the apparatus when seen from the main scanning direction. Reference numeral 101 is an ink jet recording head; reference numeral 102 is a carriage mounting the recording head 101 thereon; reference numeral 103 is a carriage shaft in a cylindrical shape for reciprocally moving the carriage in the main scanning direction; reference numeral 104 is a conveying roller for holding a recording sheet and conveying it in the sub scanning direction; reference numeral 105 is a dependent roller for pressing the recording sheet on the conveying roller 104 to create conveyance power; reference numeral 106 is a discharge roller for delivering the recording sheet on which recording has been performed; reference numeral 107 is a dependent roller for pressing the recording sheet on the discharge roller 106 to create conveyance power; reference numeral 108 is a paper guide opposed to the recording head 101 for supporting the recording sheet; reference numeral 109 is a reflection type photosensor provided on an upstream side in a sheet conveyance direction of the contact point between the conveying roller 104 and the dependent roller 105 for detecting front and rear ends of the recording sheet; reference numeral 110 is a feeding roller having an incomplete circular cross-section with a segment thereof cut away for picking up sheet by sheet the recording sheet and conveying it; reference numeral 111 is a paper tray for stacking and containing unrecorded recording sheets; reference numeral 112 is a discharge stacker for stacking recording sheets on which recording was made; reference character S is a recording sheet.

FIG. 22 shows an example of a recording process performed by a control system in the recording apparatus. Upon a reception of a recording signal from a host computer, an unshown LF motor not shown drives to rotate the feeding roller 110 so that the recording sheet S on the paper tray 111 is picked up and sent to the conveying roller 104. When the recording sheet S is fed by the conveying roller 104 to a position at which the recording sheet becomes recordable and is set thereat (S2101), a buffer memory stores received data after expanded as recording data (S2102). Then, the carriage 102 is reciprocally moved in the main scanning directions by drive of a CR motor not shown, and the recording head 101 records the recording data stored in the buffer memory on the recording sheet S. When the recording head finishes recording of the recording data in the buffer memory, the recording sheet is fed by a predetermined amount Ln in the sub scanning direction, and the carriage is returned to the home position (S2103). The operations at steps S2102 to S2103 are repeated until the sensor 109 detects the rear end of the recording sheet S. If the host computer gives a delivery command midway, the process goes to a delivery process of the recording sheet at step S2112 (S2104). When the sensor 109 detects the rear end of the recording sheet S (S2105), the operations similar to the operations at steps S2102 to S2104 are repeated until a post-detection sheet conveyance amount L exceeds a predetermined amount L2 (S2108 to S2111). When the conveyance amount L becomes equal to or exceeds the predetermined amount L2, the process goes to the delivery process of the recording sheet at step S2112 (S2107). Then, the program seeks as to whether the received data from the host computer still remain (S2113), and if the received data are still remaining, the process goes back to step S2101 and repeats the operations described above again.

With such a conventional serial type recording apparatus, however, a problem arises in which the used recording sheets become bulky in comparison with the volume of recorded information because the apparatus can record on only one side of the recording sheets.

A recording apparatus has been disclosed, as shown in Japanese laid-open Showa No. 61-154,865 (patent), in which a pair of conveying rollers placed on a downstream side of recording means in the conveyance direction holds and stops the lower end of a recording sheet after recording on one side of the recording sheet finishes, and in which the rollers are then made to reverse their rotations to convey the recording sheet to the recording means again. With this recording apparatus, recording on the other side of the recording sheet is conducted while the lower end of the recording sheet is conveyed as the front end in the conveyance direction, and therefore, recording work starts from the lower end of the recording sheet. The host computer transmits serial recording data in an ordinary sequence even in such a situation, so that the buffer memory must once hold the serial recording data of one page volume for the other side and must deliver the data at its output from the last data of the recording data for the other side, thereby raising problems that the recording apparatus becomes expensive since it needs a larger buffer memory as well as that recording speed of the apparatus becomes low. Where the recording means is constituted of an ink jet recording system, unfixed ink may be smeared by the conveying roller pair because the recording sheet moves reciprocally while nipped by the conveying roller pair immediately after recording of one side thereof. In particular, though color recording apparatuses of an ink jet recording method using four color recording heads have been developed these days, a smeared ink problem may arise due to the conveying roller pair, since a large amount of ink is discharged on the recording medium in those color recording apparatuses.

SUMMARY OF THE INVENTION

It is an object of the invention to provide a recording apparatus which does not require to use a large capacity line buffer memory, which is inexpensive and operates with a high speed, and which is recordable on both sides of a recording medium, and to provide its method.

A representative constitution of the invention to accomplish the object is characterized in having: a carriage for holding recording means for recording a recording medium; a platen placed in opposite to said recording means for supporting said recording medium; conveying means normally and reversely rotatable for introducing said recording medium into said recording means; a passage introducing, after said recording medium passes through said recording means, said recording medium into said conveying means by rendering a lower end of said recording medium as a front end in a conveyance direction; and a line buffer memory for temporarily storing serial recording data of one scanning line of said recording means, said recording data being expandable to H stages and M columns, wherein in a double side recording mode, said recording means records one side of said recording medium; said recording medium is conveyed in rendering an upper end of said recording medium as a front end in the conveyance direction by reversely rotating said conveying means after made to pass through said passage and set at a recording commencement position for the other side thereof, and said recording means records on the other side of said recording medium by transmission from said line buffer memory to said recording means said serial recording data reversely permuted so that data at the H stage and the M column constitute data at said first stage and said first column.

The recording medium on one side of which the recording means has recorded is conveyed again to the recording means using the passage rendering the lower end of the recording medium as the front end in the conveyance direction. The recording medium is set at the recording commencement position for the other side by normally rotating the conveying means at that time. Then, the conveying means is reversely rotated to perform recording on the other side of the recording medium by sending the upper end of the recording medium as the front end in the conveyance direction.

Although in a recording process for the other side, the recording means faces to the recording medium in a condition that the data are reversed with respect to stages and columns against the serial recording data expandable to H stages and M columns, the recording means can perform recording work at the similar position and similar scanning direction to those of recording on one side because the reversed serial data in which data of the stage H and the column M constitute data of the first stage and the first column are transmitted from the line buffer memory to the recording means.

Thus, even for recording work for the other side, the recording apparatus records in a direction from the upper end to the lower end of the recording medium, so that it is enough for the recording apparatus to hold the serial recording data only of one scanning line of the recording means sequentially sent out of a host computer, and so that a large capacity buffer memory will be unnecessary.

DETAILED DESCRIPTION OF THE PREFERRED EMBODIMENTS

First Embodiment

Figure 1:
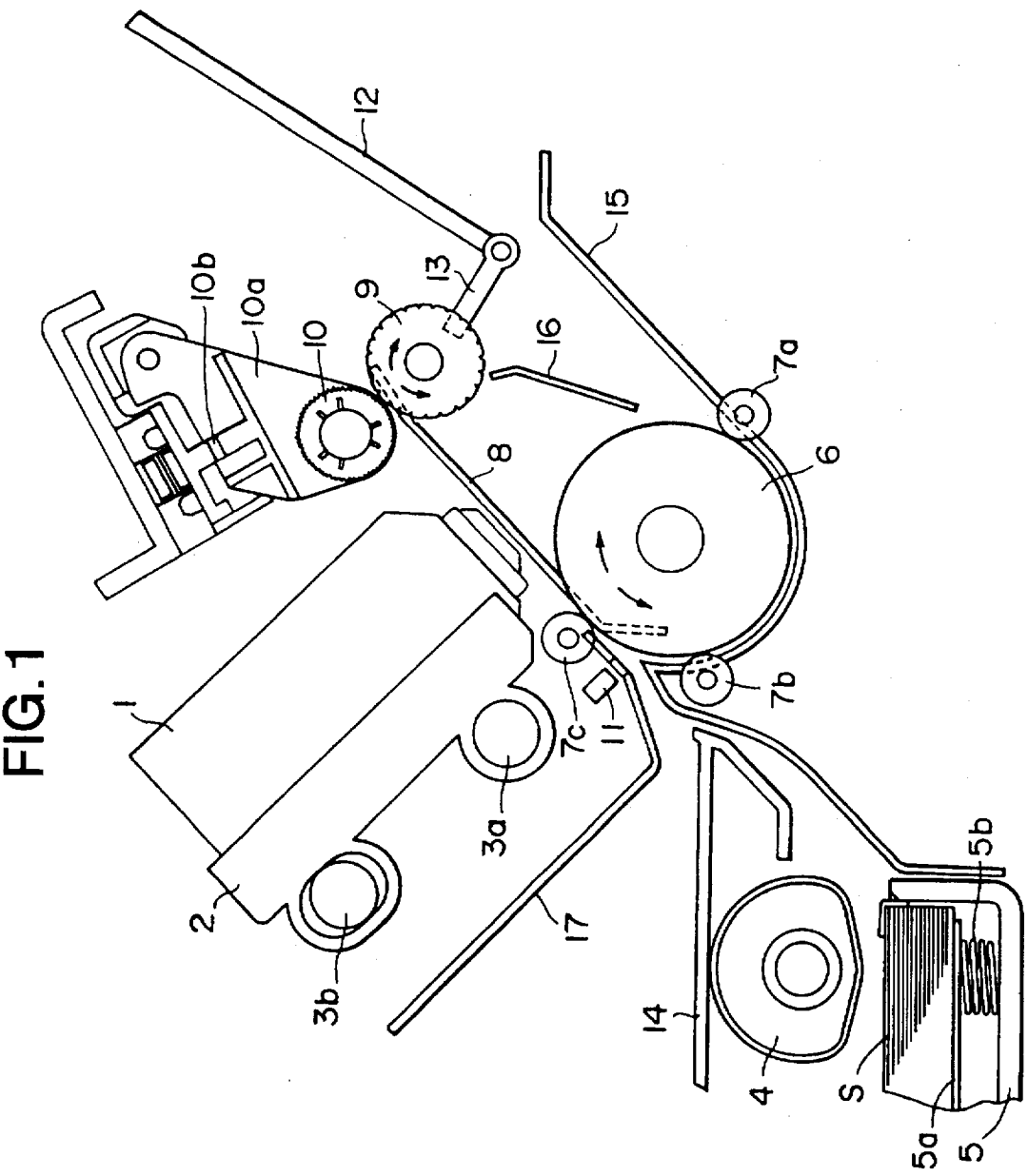
FIG. 1 is a cross-sectional diagram showing schematic constitution of a recording apparatus of a first embodiment.

Referring to the drawings, there describes an embodiment of a recording apparatus to which the invention applies. This embodiment is described using a serial type recording apparatus in which recording media are carried in a sub scanning direction and in which recording means is scanned in a main scanning direction. The entire structure of the recording apparatus is described first, and then, its control system is described.

(Apparatus Constitution)

FIG. 1 is a cross-sectional diagram showing schematic constitution of the recording apparatus of the first embodiment. As shown in FIG. 1, the recording apparatus of the embodiment has a recording head I as the recording means, adapting an ink jet recording method in which ink is discharged to make recording. That is, this recording head includes liquid outlets (orifices), liquid passages, energy actuation portions provided at a part of the respective liquid passages, energy generating means for generating droplet forming energy to actuate to the liquid located at the energy actuate portion, and the like.

As energy generating means for generating such energy, there are a recording method using an electro-mechanical converter such as a piezoelectric device, a recording method using energy generating means that heats ink by radiation of electromagnetic wave such as laser beam and discharges droplets by this heat actuation, a recording method using energy generating means that heats liquid by an electrothermal converter such as a heating device having a heating resistor and discharges the liquid, and the like.

The recording head used for an ink jet recording method, among them, in which the thermal energy forces the liquid to be discharged, is capable of high resolution recording because the orifice for forming droplets to be discharged and discharging recording droplets can be arrayed with high density. The recording head, among them, in which the electrothermal converter is used as the energy generating means, is readily made compact and has an advantage, because of sufficiently utilizing IC technology or micro fabrication technology accompanied with recent technological progresses in the art of semiconductor and significant improvements of reliability, easily being assembled with high density, and rendering manufacturing costs inexpensive.

Though the recording apparatus of the ink jet recording method solely for black color recording is exemplified, this embodiment can be applicable to a multicolor recording apparatus adapted to the ink jet recording method using recording heads in respect to four colors. The conveying method of the recording media, and storing and output method of recording data can be applicable to recording apparatuses other than those of the ink jet recording method, for example, to recording apparatuses of a thermal transfer recording method or an electrostatic method.

The recording head 1 is detachably held on a carriage 2. The carriage 2 is slidably supported to a lead screw 3a and a cylindrical carriage shaft 3b which are provided so as to extend in a crossing direction (perpendicular direction in this embodiment: main scanning direction) to a direction of sheet conveyance. The lead screw 3a has a helical groove (not shown), which engages a part of the carriage 2. Accordingly, by rotational drive of drive means not shown, the lead screw 3a is driven to rotate, thereby reciprocally moving the carriage 2 mounting the recording head 1 thereon in the main direction along the carriage shaft 3b.

A feeding roller 4 having an incomplete circular cross-section with a segment thereof cut away is arranged over a supplying stacker 5 as supporting member for supporting recording sheets S, picking up a recording sheet S on the supplying stacker 5 and feeding it during paper feeding operation. A pushing plate 5a is provided to stack the recording sheets S on the supplying stacker 5. The pushing plate 5a is pushed upward by a spring 5b for pushing plate from the back of the plate; when rotated, the feeding roller 4 contacts the upmost recording sheet S. Although in this embodiment, a supplying stacker 5 stacking plural recording sheets S on it, a supporting member like a manual supplying tray supplying single recording sheet S can be used instead of it.

A conveying roller 6 capable of rotationally driving normally and reversely in arrow directions by drive means is arranged over the supplying stacker 5, thereby holding the recording sheet S as well as conveying it in a sub scanning direction (direction perpendicular to the main scanning direction). Reference numerals 7a, 7b, 7c are dependent rollers, which produce conveyance power through pushing the recording sheet to the conveying roller 6.

A paper guide (platen plate) 8 is disposed at a position opposed to the recording head 1 for ensuring the position (recording section: sheet processing portion) at which printing is to be made on the recording sheet, creating tiny space between the recording head 1 and the face of the paper guide 8 for passing the recording sheet S.

A discharge roller 9 capable of rotationally driving normally and reversely in arrow directions by drive means not shown is provided over the recording head 1 and conveys the recording sheet S on which recording has been made to deliver it. A dependent roller 10 is arranged adjacently to the discharge roller 9, and both of the rollers 9, 10 are contacted to each other and nip and convey the recording sheet S therebetween. The dependent roller 10 is rotatably supported to supporting member 10a and pushed on the discharge roller 9 through the supporting member 10a urged by springs 10b.

A sheet sensor 11 as detecting means is disposed below the recording head 1 and detects front and rear ends of the recording sheet S conveyed to the recording head 1. The sheet sensor 11 is arranged on an upstream side in the sheet conveyance direction of the contact point between the conveying roller 6 and the dependent roller 7c. In this embodiment, a reflection type photosensor is used as the sensor.

A holding tray 12 as a mid-holding member is disposed above the discharge roller 9 to temporarily hold and stack the recording sheets S on only one side of which recording has been made. The holding tray 12 has a bottom plate 13 capable of being opened and shut. The holding tray 12 is disposed inclinningly so that it receives the recording sheet S on its back side (rear side of the recording sheet S). The recording sheet S slides down on a slope of the holding tray 12 and the recording sheet S contacts with the bottom plate 13 on its end to be held. In addition to the holding tray 12, a discharging tray 14 is disposed below the recording head 1 to hold and stack the recording sheets S on both sides of which recording has been made. Guide plates 15, 16 are disposed below the holding tray 12 and constitute a passage introducing the recording sheet S falling from the holding tray 12 again to the conveying roller 6 when the bottom plate 13 is made open. Another guide plate 17 is also disposed above the discharging tray 14.

Figure 2:
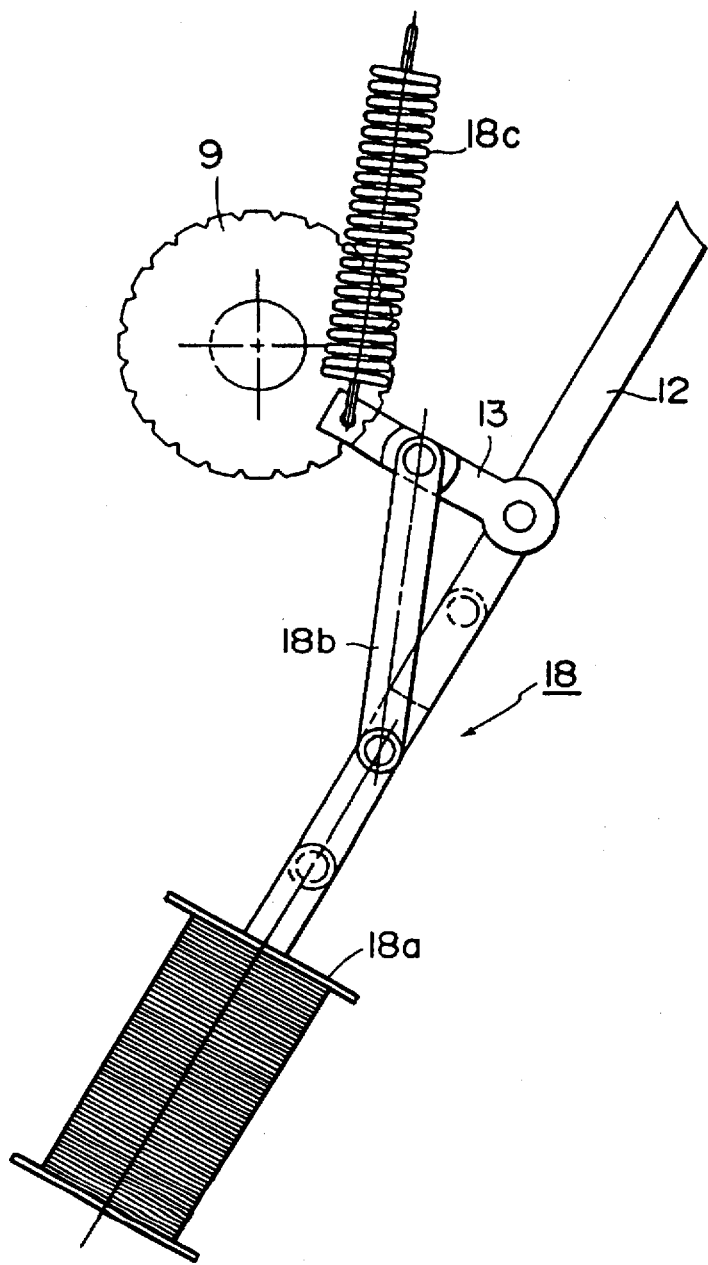
FIG. 2 is an illustration showing a mechanism for opening and shutting a bottom plate of the first embodiment.

A opening and shutting mechanism 18 to open and shut the bottom plate 13 is, as shown in FIG. 2, constituted of a solenoid 18a electrically turned on and off, a lever 18b connecting the bottom plate 13 and the solenoid 18a, and a spring 18c pulling the bottom plate 13 toward its closing position. Accordingly, although when the solenoid 18a is in an off-condition the bottom plate 13 is closed by force of the spring 18c, when the solenoid 18a is turned on, the lever 18b is pulled down in opposition to force of the spring 18c, thereby opening the bottom plate 13. If the solenoid 18a is turned off again, the bottom plate 13 is closed by recoiling force of the spring 18c.

Figure 3:
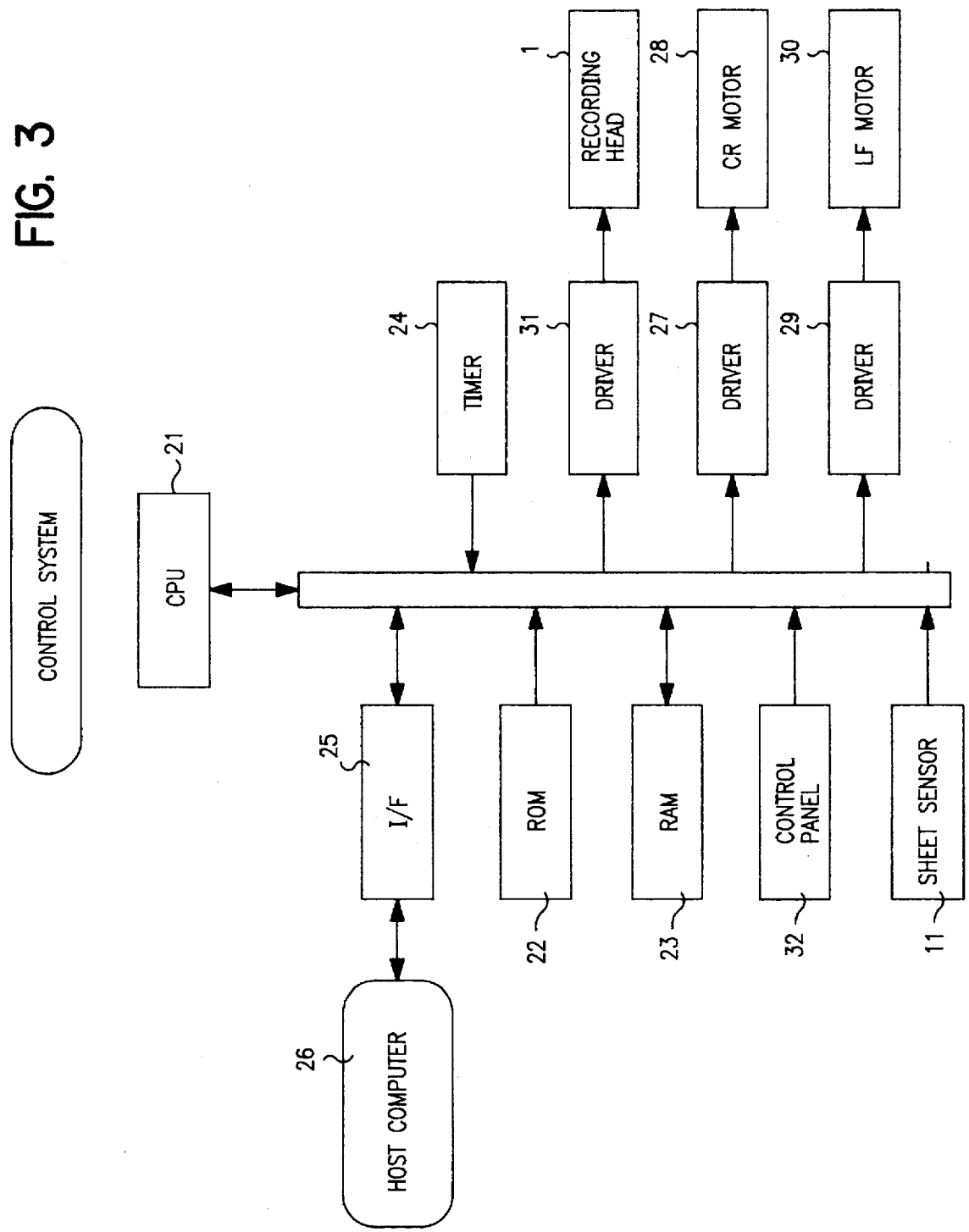
FIG. 3 is a block diagram showing constitution of a control system of the first embodiment.

Referring to the drawings, constitution of the control system in the recording apparatus is described as follows. FIG. 3 is a diagram of the control system; FIG. 4 is a diagram of a buffer memory storing the recording data.

As shown in FIG. 3, the control system has a CPU 21 in the form of a microprocessor, reading out programs and various type data out of a ROM 22, a RAM 23, and the like, implementing necessary operations and judgments, and controls drives of the entire apparatus by providing various control signals in compliance with a control program. The ROM 22 is a program memory and stores various programs, data, and whatever for operation of the CPU 21. The RAM 23 is a buffer memory and is composed of a working area for temporarily storing data and computation results on which the CPU 21 has currently commanded, a text area for retaining various data, and the like. A timer 24 measuring time based on an instructive signal transmitted out of the CPU 21 and delivering time information is connected to the CPU 21 through a data bus.

The CPU 21 is connected to a host computer 26 through an interface 25 and controls recording operation based on recording data transmitted out of the host computer 26 and stored in the ROM 22 or the RAM 23. The CPU 21 controls a CR motor 28 and an LF motor 30 through motor drivers 27, 29 and controls the recording head 1 through a head driver 31 based on the recording information stored in the RAM 23. The CPU 21 is connected to a control panel 32 for setting the recording conditions such as recording modes and to the sheet sensor 11 for detecting the front and rear ends of the recording sheets as described above, through the data bus.

Figure 4A:
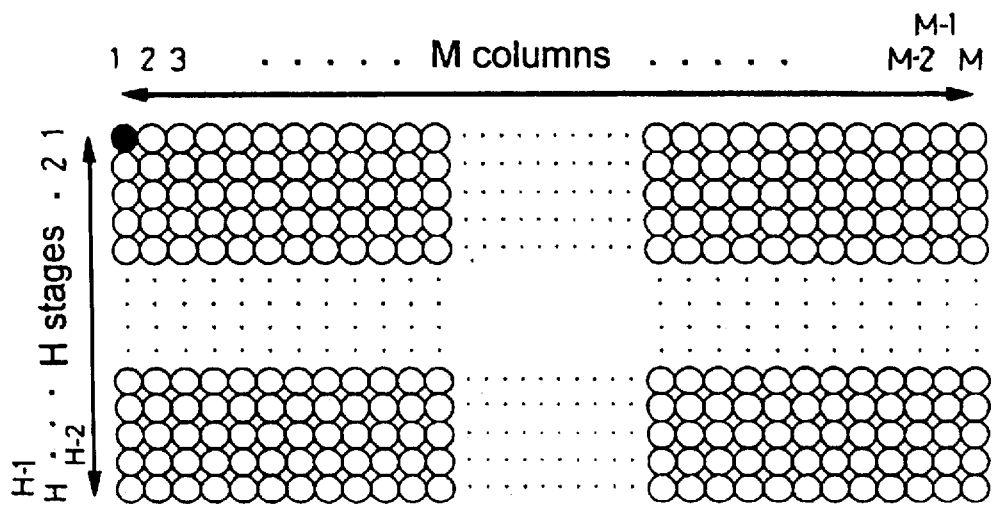
FIGS. 4(a) and 4(b) show a condition of use of a buffer memory of the first embodiment.
Figure 4B:
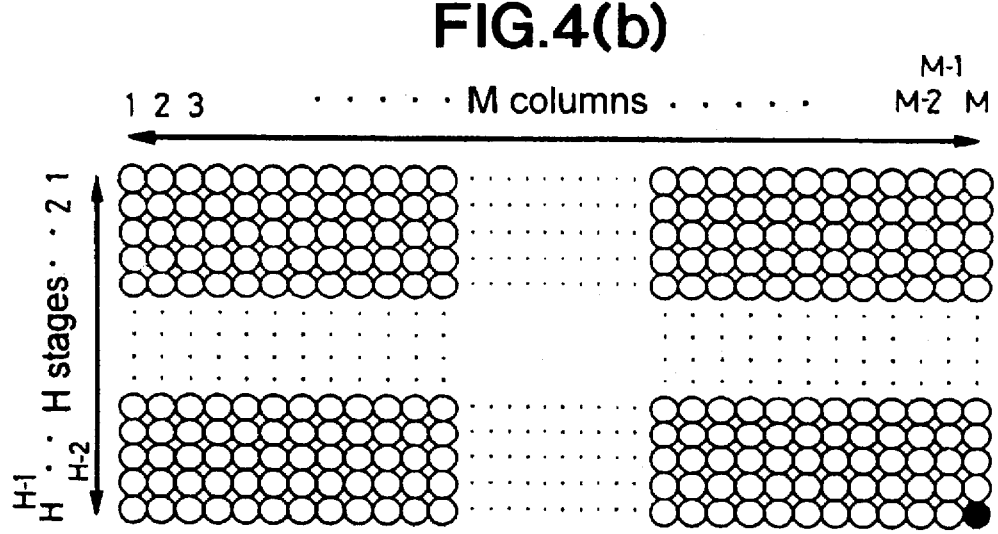

The RAM 23, as a buffer memory, stores line data of one scanning line or multiple scanning lines. The line buffer is for storing data as to which location in the recording area the orifices of the recording head make recording to within a single main scanning of the recording head. That is, as shown in FIG. 4, M pieces of dots necessary to express with a predetermined dot pitch the maximum recording width of the recording sheet usable in the recording apparatus are arrayed by the number of the orifices, H pieces, of the recording head. The expanded recording data sent out of the host computer are stored in the buffer from dot information of the first stage and the first column (dot filled in black) as shown in FIG. 4(a) when one side of the recording sheet is to be recorded and stored in the buffer from dot information of the H stage and the M column (dot filled in black) as shown in FIG. 4(b) when the other side of the recording sheet is to be recorded. It is to be noted that the dots shown in FIG. 4 schematically indicate dots expanded and recorded on the recording sheet and that each dot is not always handled as a single recording data.

(Control System)

Figure 5:
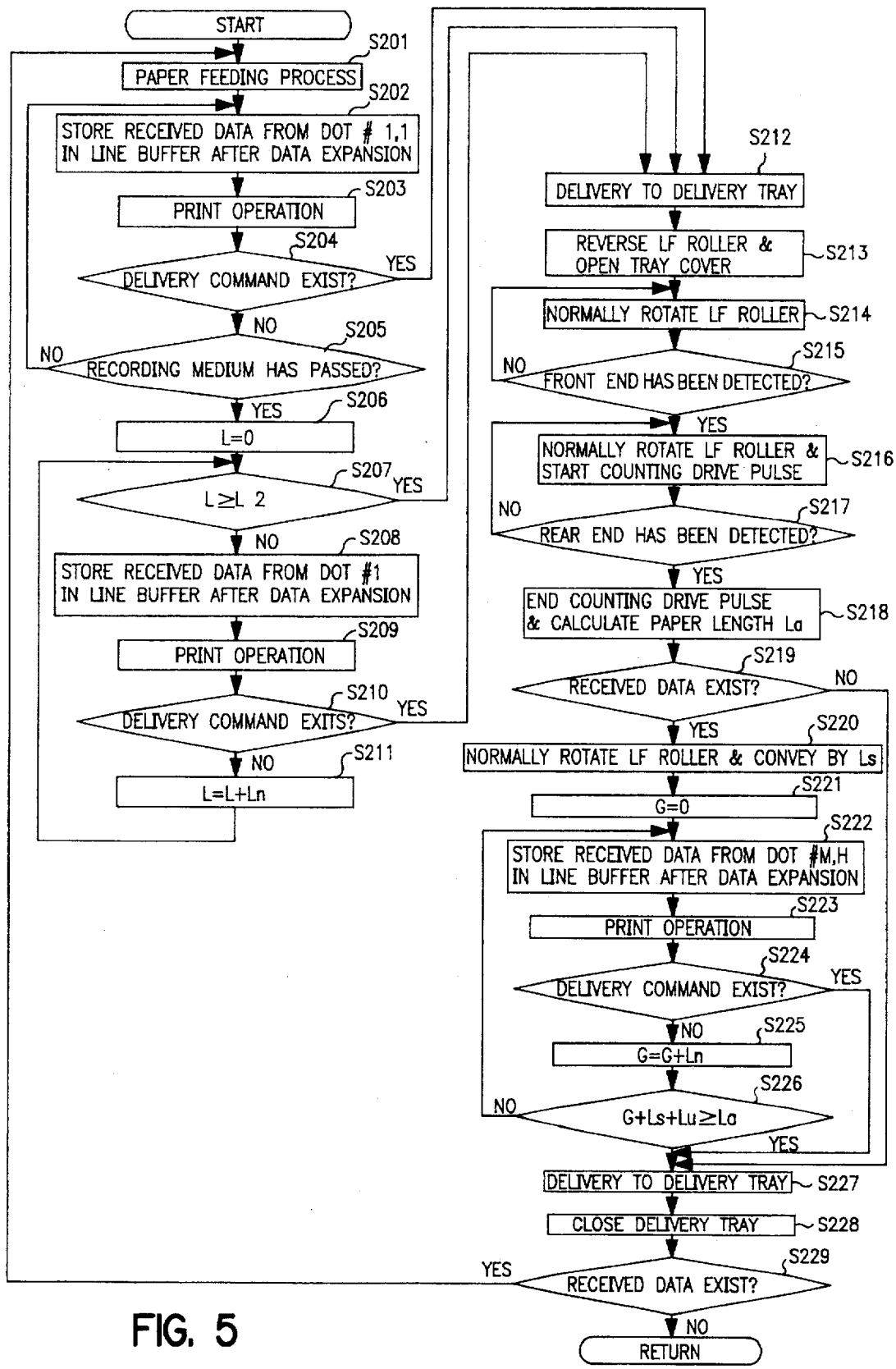
FIG. 5 is a flow chart showing a flow of operations at a time of a double side recording mode of the first embodiment.
Figure 6:
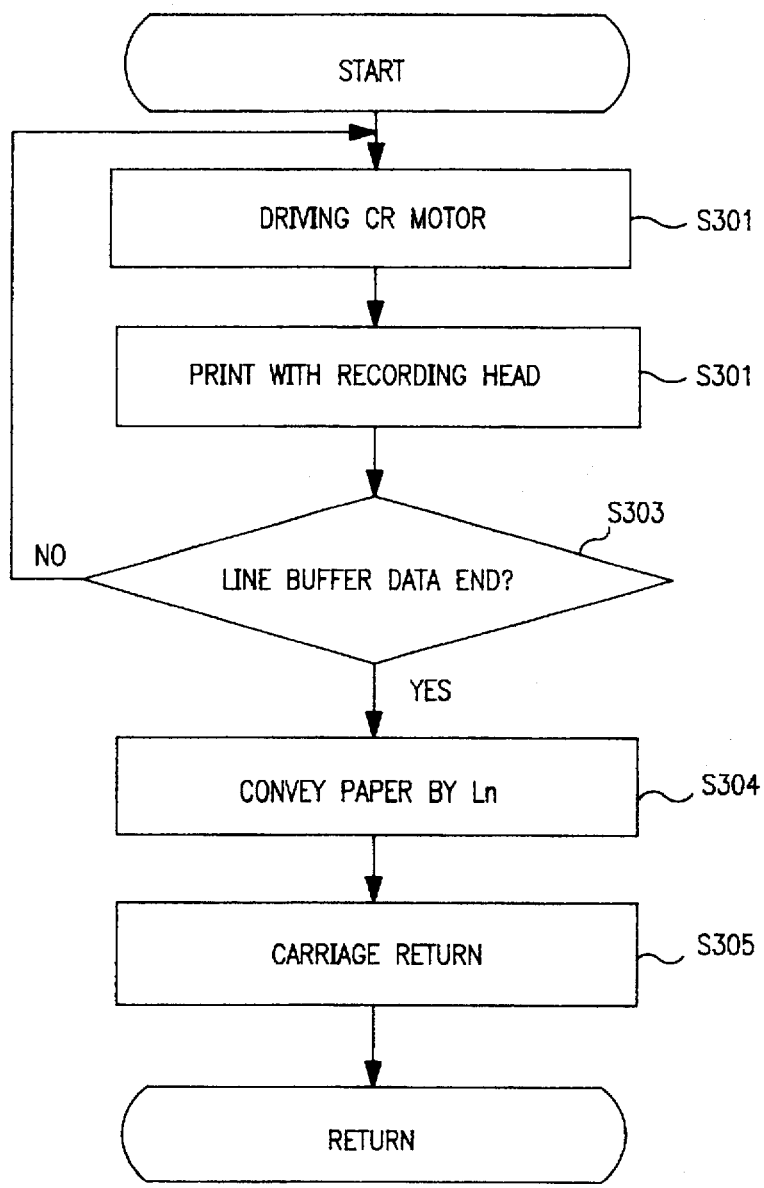
FIG. 6 is a flow chart showing a flow of recording operation of the first embodiment.

Next, control operation of the recording apparatus by the control system at the time of a double side recording mode is described. FIG. 5 is a flow chart showing a flow of operations at the time of the double sides recording mode; FIG. 6 is a flow chart showing a flow of recording operation; FIGS. 7 to 14 are cross-sectional diagrams of the recording apparatus showing a conveyance condition of the recording sheet.

Figure 7:
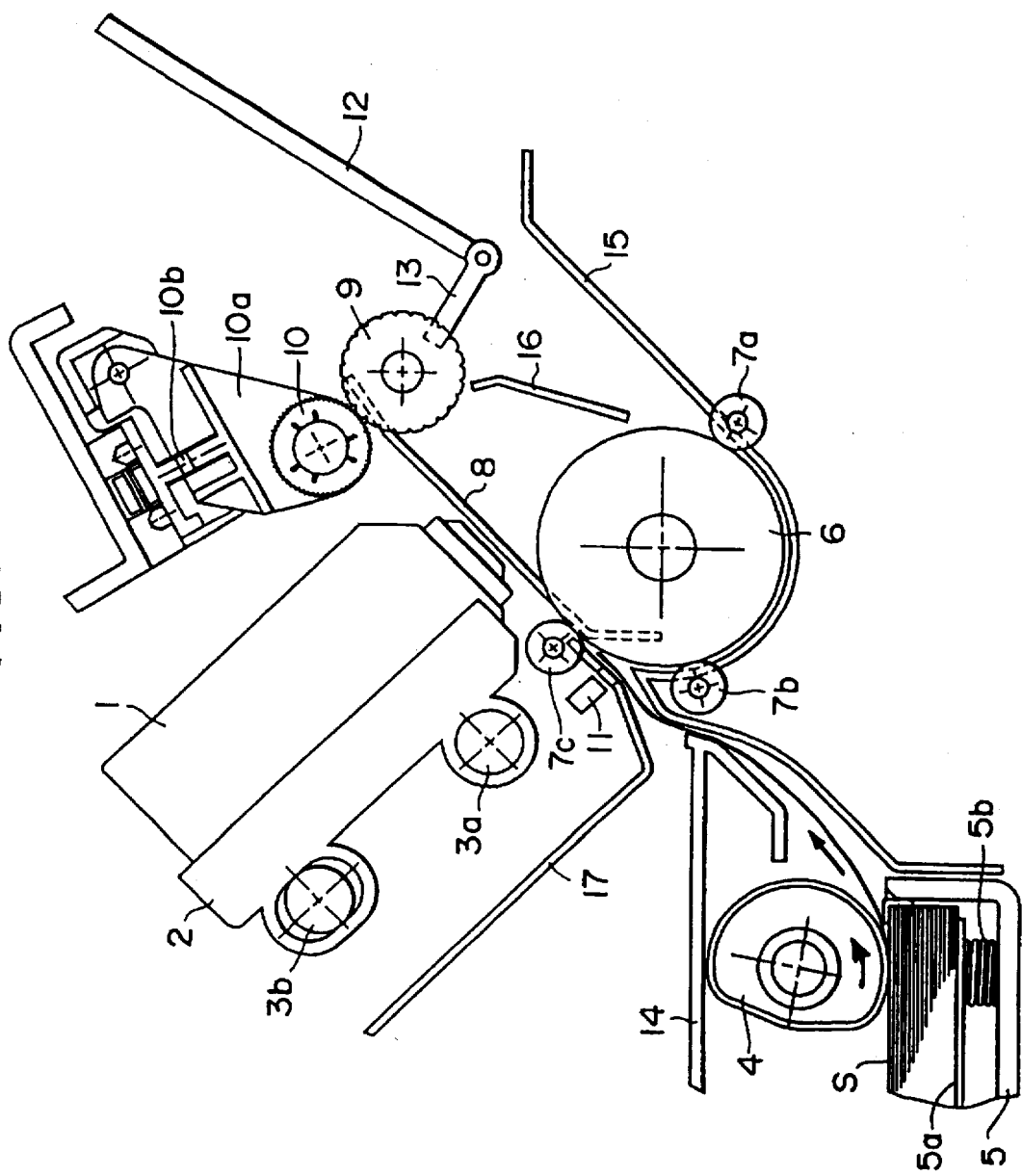
FIGS. 7 to 14 are cross-sectional diagram of the recording apparatus, showing a conveyance condition of a recording medium of the first embodiment.

In FIG. 5, upon a reception of the recording signal from the host computer, first, the LF motor 30 normally drives to rotate the feeding roller 4, and as shown in FIG. 7, the feeding roller 4 picks up sheet by sheet the recording sheet S on the supplying stacker 5 and feeds it individually. The recording sheet S is conveyed by the conveying roller 6 and the dependent roller 7c to the recording position and is set thereat (S201). Hereinafter, the front end in the conveyance direction at the time of one side recording is defined as the upper end of the recording sheet S, and the rear end the conveyance direction is defined as the lower end of the recording sheet S.

After the received data are expanded as the recording data, they are stored in the line buffer (S202). At step S203, the CPU 21 implements recording operation shown in FIG. 6. First, the CR motor 28 is driven normally and reversely to commence a main scanning of the carriage 2 mounting the recording head 1 thereon (S301), and the recording head 1 records the recording data in the line buffer from the first column on the recording sheet S (S302). When recording of the data of M columns in the line buffer finishes (S303), the recording sheet S is conveyed by a predetermined amount Ln in a sub scanning direction (S304). The carriage 2 is then returned to the position to start the main scanning (S305).

Figure 8:
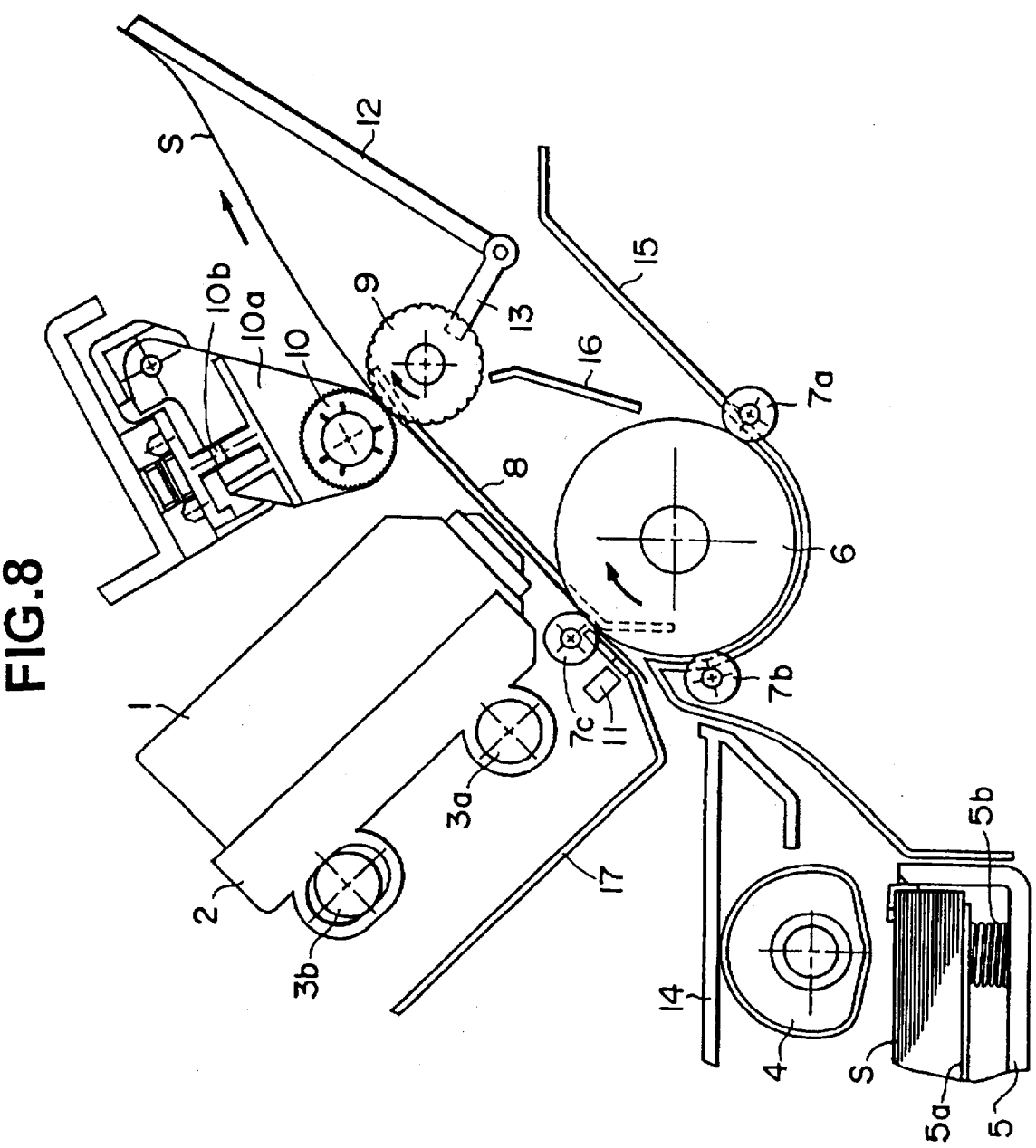

The processes at steps S202, S203 are repeated until the sheet sensor 11 detects the rear end of the recording sheet S as shown in FIG. 8. If the host computer 26 provides a command for delivery during the repeat, the process goes to step S212 (S204). Processes similar to those at steps S202, S203 are repeated from the detection of the rear end of the recording sheet S by the sheet sensor 11 (S205) to the time when a sheet conveyance amount L in the sub scanning direction exceeds a predetermined amount L2 (S208, S209). If the conveyance amount L is equal to or greater than the predetermined amount L2, the process goes to step S212 (S207).

Figure 9:
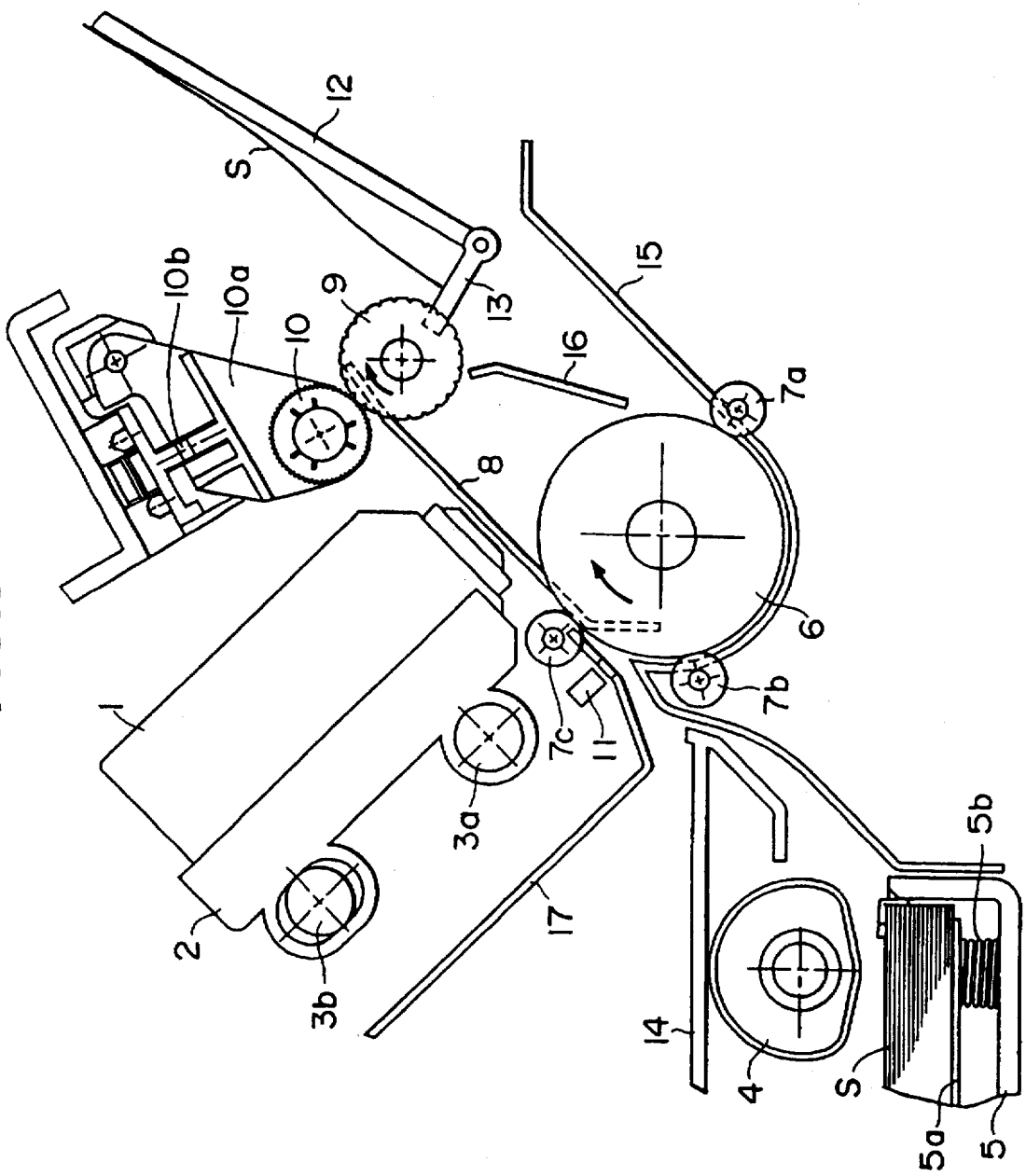
Figure 10:
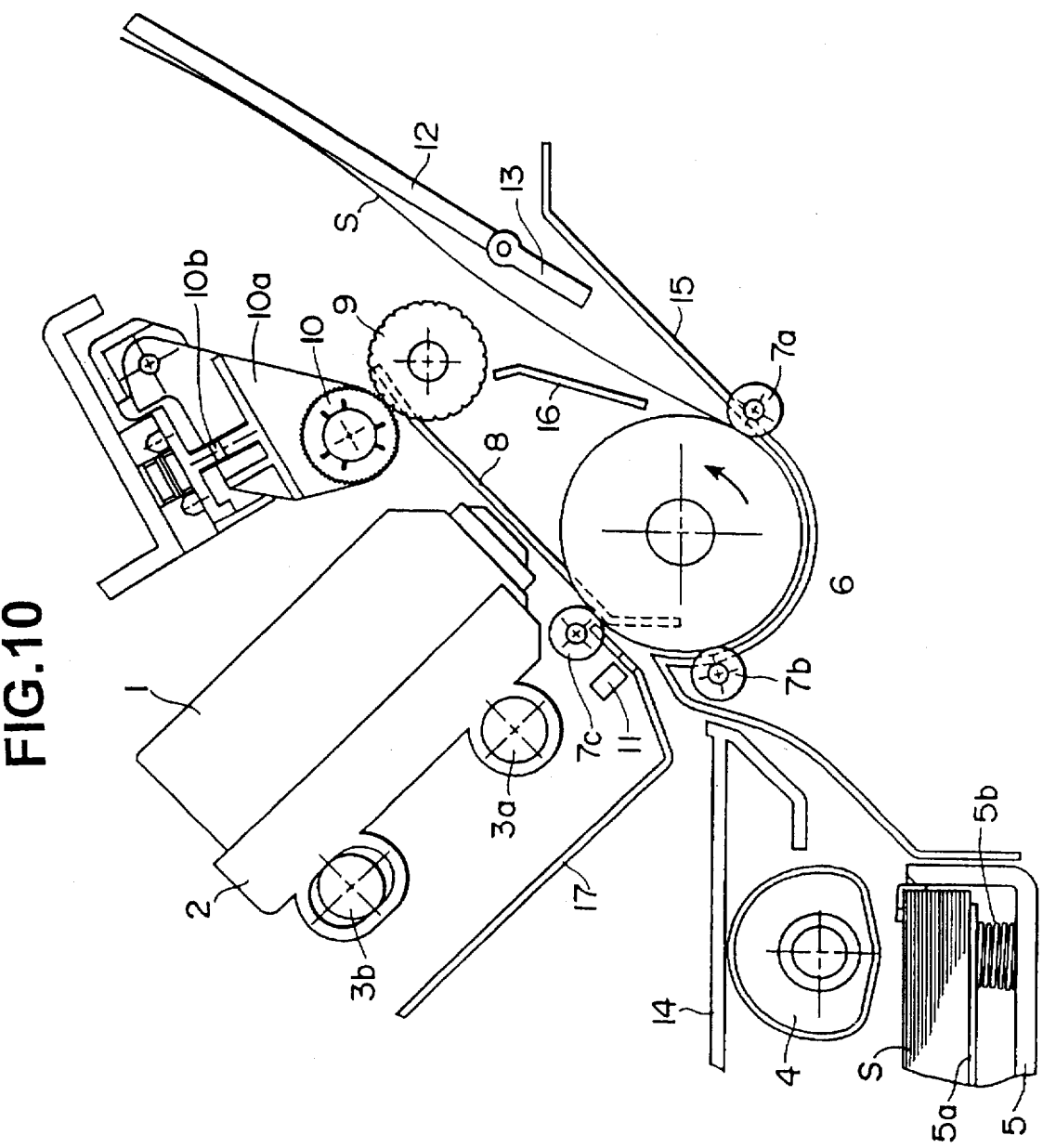

The recording sheet S on one side of which recording has been made is delivered to the holding tray 12 as shown in FIG. 9 (S212). While the LF motor 30 is driven reversely to rotate the conveying roller 6 in a direction opposite to the normal rotational direction, the solenoid 18a in the opening and shutting mechanism 18 described above is turned on to open the bottom plate 13 of the holding tray 12 (S213). When the bottom plate 13 is made open, the previously released recording sheet S falls in the passage formed by the guide plates 15, 16 as shown in FIG. 10, so that its lower end reaches the contact point between the conveying roller 6 and the dependent roller 7a. Because the conveying roller 6 is reversely rotating at that time, the lower end of the recording sheet S stops at the contact point between the conveying roller 6 and the dependent roller 7a, so that the recording sheet S is positioned so as to be in parallel to the main scanning direction, or namely, without skewing.

Figure 11:
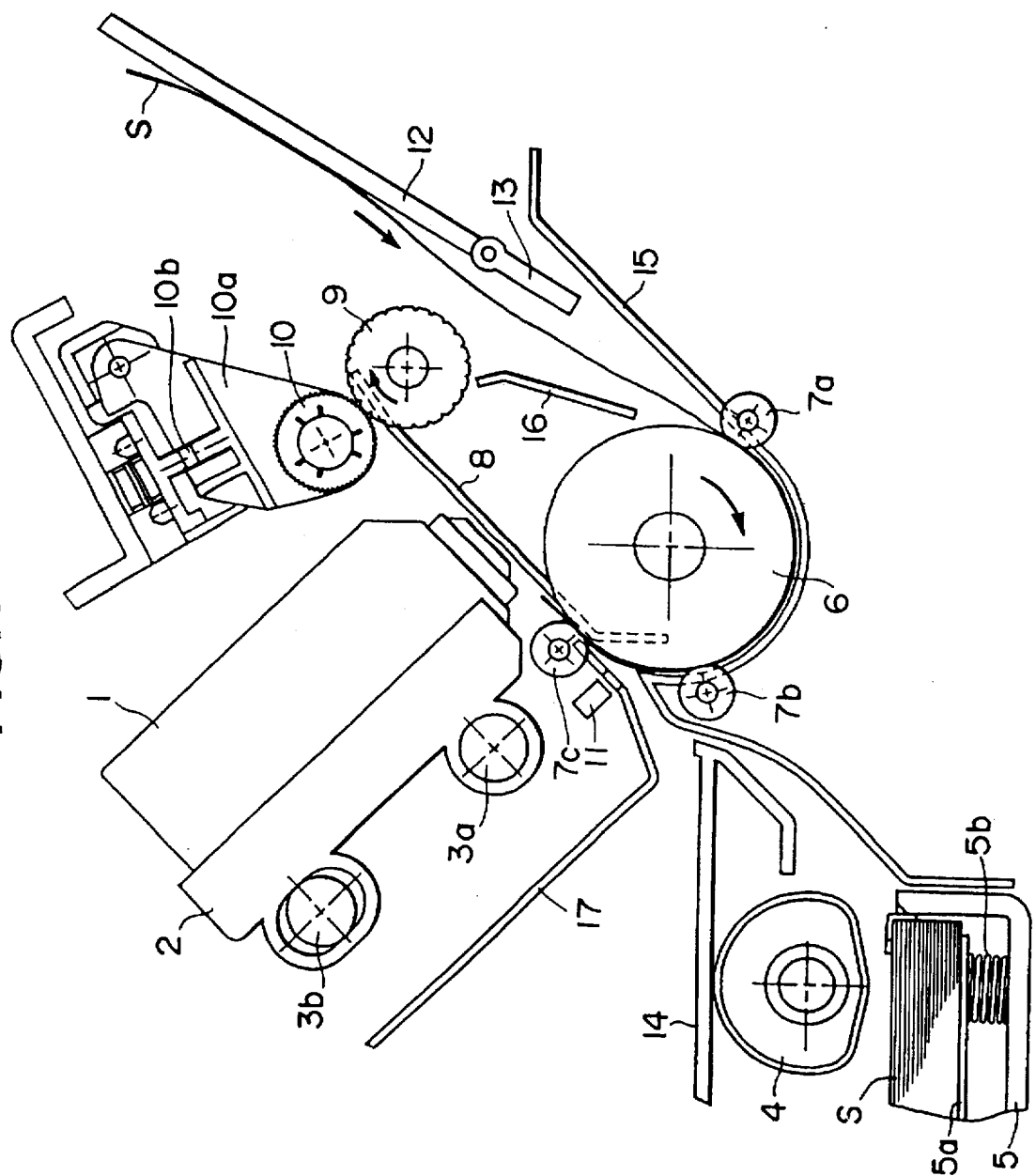

Next, the LF motor 30 is normally driven to rotate the conveying roller 6 normally, thereby conveying the recording sheet S on one side of which recording has been made as shown in FIG. 11 (S214). When the sheet sensor 11 detects the front end in the conveyance direction of the recording sheet S (the lower end of the recording sheet S), the number of drive pulses of the conveying roller 6 is counted until the rear end (the upper end of the recording sheet S) is detected to calculate a length La in the sub scanning direction of the recording sheet S (S216 to S218). After the calculation for the length La of the recording sheet finishes, the process goes to step S227 if no received data from the host computer 26 exists (S219).

Figure 12:
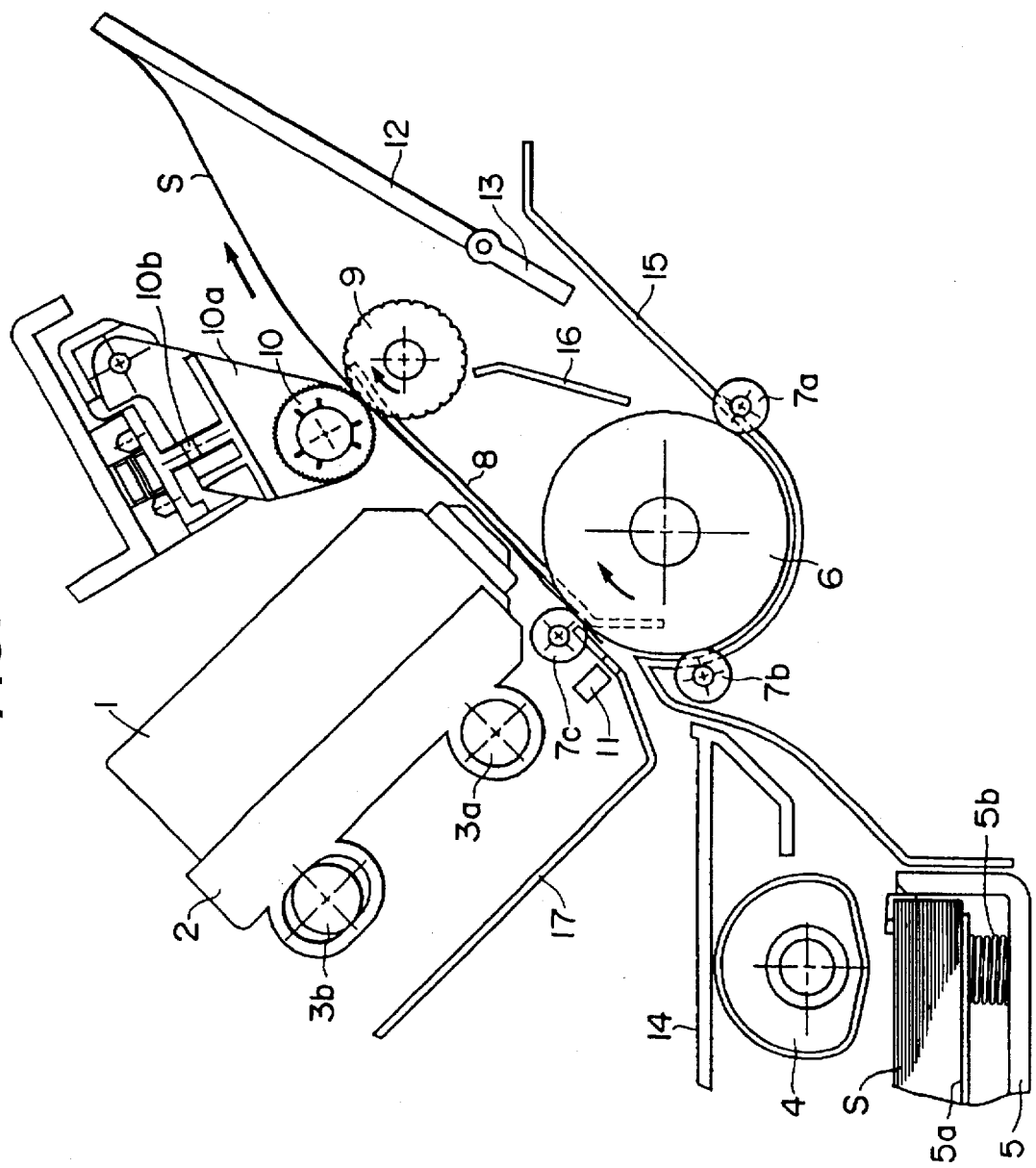

If the received data exist, the LF motor 30 is normally driven to normally rotate the conveying roller 6, thereby conveying the recording sheet S by a predetermined amount Ls, setting the sheet at a recording commencement position for recording the other side as shown in FIG. 12 (S220). The predetermined amount Ls is a shorter distance than the distance between the sheet sensor 11 and the contact point of the conveying roller 6 and the dependent roller 7c.

Figure 13:
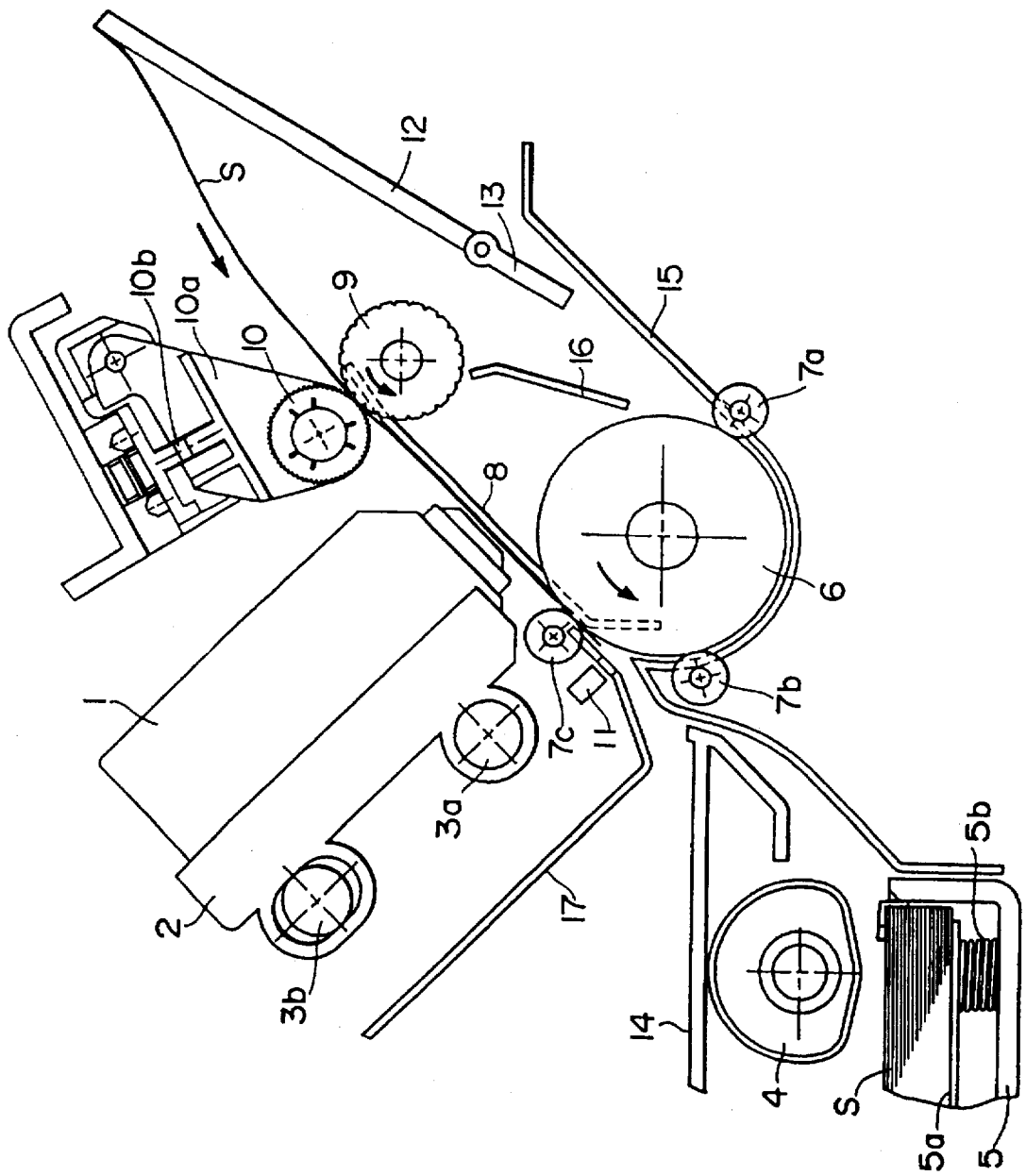

After the received data are expanded as the recording data, the positions of the orifices used for recording are set so as to reverse their positions at the time for the one side recording and so that the data of the H stage and the M column constitute as the starting point as shown in FIG. 4(b) (S222). That is, as shown in FIG. 4(b), the data of the H stage and the M column are set to first dot information of the first orifice, and hereinafter, the respective data are set in a reversing manner regarding both stage and column directions, such that: the data of the H-1 stage and the M column are set to the first dot information of the second orifice; the data of the H-2 stage and the M column are set to the first dot information of the third orifice, . . . and so on. As shown in FIG. 13, the LF motor 30 is reversely driven to rotate the conveying roller 6 reversely, thereby conveying the recording sheet S by rendering the upper end of the recording sheet S as the front end in the conveyance direction. That is, the recording sheet S is moved in the sub scanning direction by the predetermined amount Ln toward a direction opposite to the ordinary direction, and the recording head 1 is controlled in the same manner as for the one side recording operation (see FIG. 6). Operations at steps S222 to S225 are repeated until the total of a conveyance amount G in the sub scanning direction and of preset front end margin Ls and rear end margin Lu exceeds the previously calculated length La of the recording sheet S.

Figure 14:
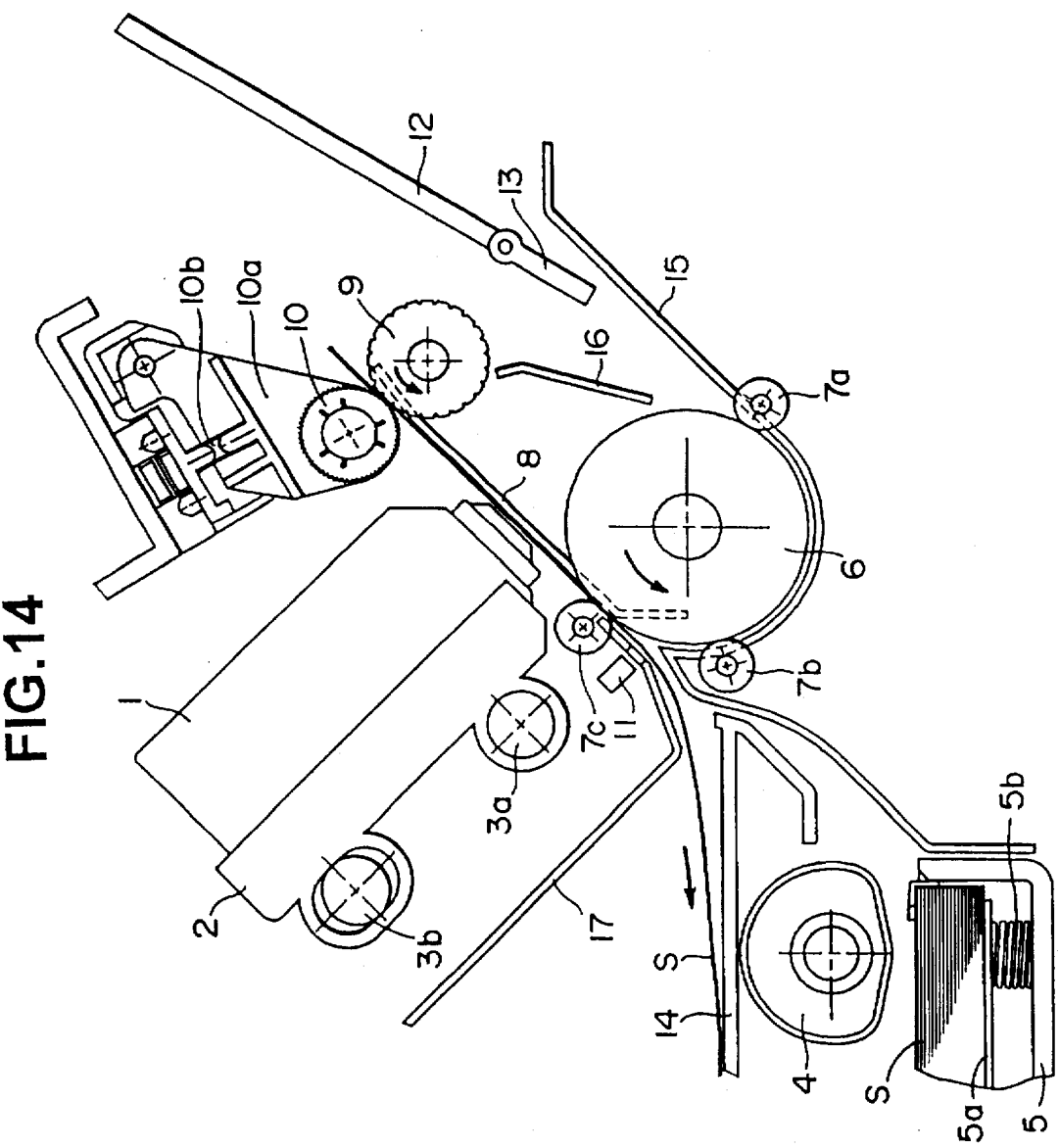

When the total of the conveyance amount G, the preset front end margin Ls, and the preset rear end margin Lu is equal to or exceeds the previously calculated length La of the recording sheet S (S226), the LF motor 30 is reversely driven to reverse the conveying roller 6 as shown in FIG. 13, thereby delivering onto the discharging tray 14 the recording sheet S on both sides of which recording is made, as shown in FIG. 14 (S227). Then, the solenoid 18a of the opening and shutting mechanism 18 is turned off, thereby closing the bottom plate 13 of the holding tray 12 (S228). If the received data still exist, the process returns to the step S201 and repeats the routine up to S229 in the same manner.

In the case of the ordinary recording mode (one side recording mode), the bottom plate 13 of the holding tray 12 is kept closed (a state shown in FIG. 9) and used. After recording on the one side finishes, the recording sheet S can be conveyed to the discharging tray 14 from the lower end thereof by reversing the discharge roller 9 and the conveying roller 6 without recording of the other side. By using the control panel 32, one of the recording modes is selected.

The serial type recording apparatus can effectively use the recording sheets if thus constituted and controlled. In particular, since the line buffer memory holds recording data by every scanning line of the recording head, a line buffer memory can be of a small capacity and be inexpensive. Moreover, a recording apparatus with high recording speed can be provided with less complicated constitution.

It is to be noted that although in this embodiment the serial recording data for the other side are stored in a reversing manner when brought from the host computer and stored in the line buffer memory, the data can be stored in the ordinary manner in the line buffer memory and be then made to reverse or be reversely permuted when fed to the recording head by using an additional buffer or the like.

As described above, where a large amount of ink is discharged, such as where figures are printed or where the inks are used for a multicolor recording apparatus of the ink jet recording method, curing time or drying time of ink can be ensured by adjusting open and close period of the bottom plate 13 while the recording sheet S is held on the holding tray 12. Additionally, a drier could be arranged on the holding tray 12, thereby drying the ink compulsively.

Although the recording sheet S on which a large amount of ink is discharged can possibly be waved, when the recording sheet S is brought to the recording commencement position for the other side recording, the carriage 2 may move back so as to be separated from the recording sheet S to avoid any contact between the recording head 1 and the recording sheet S, in addition to the constitution of the first embodiment. To keep the portion of the recording sheet S, which is transformed because of ink, facing to the recording head 1 flat during the recording operation for the other side and to avoid any contact between the recording head 1 and the recording sheet S, a sucking device can be built at the back face of the paper guide 8.

(Example of Constitution of Holding tray)

Figure 15:
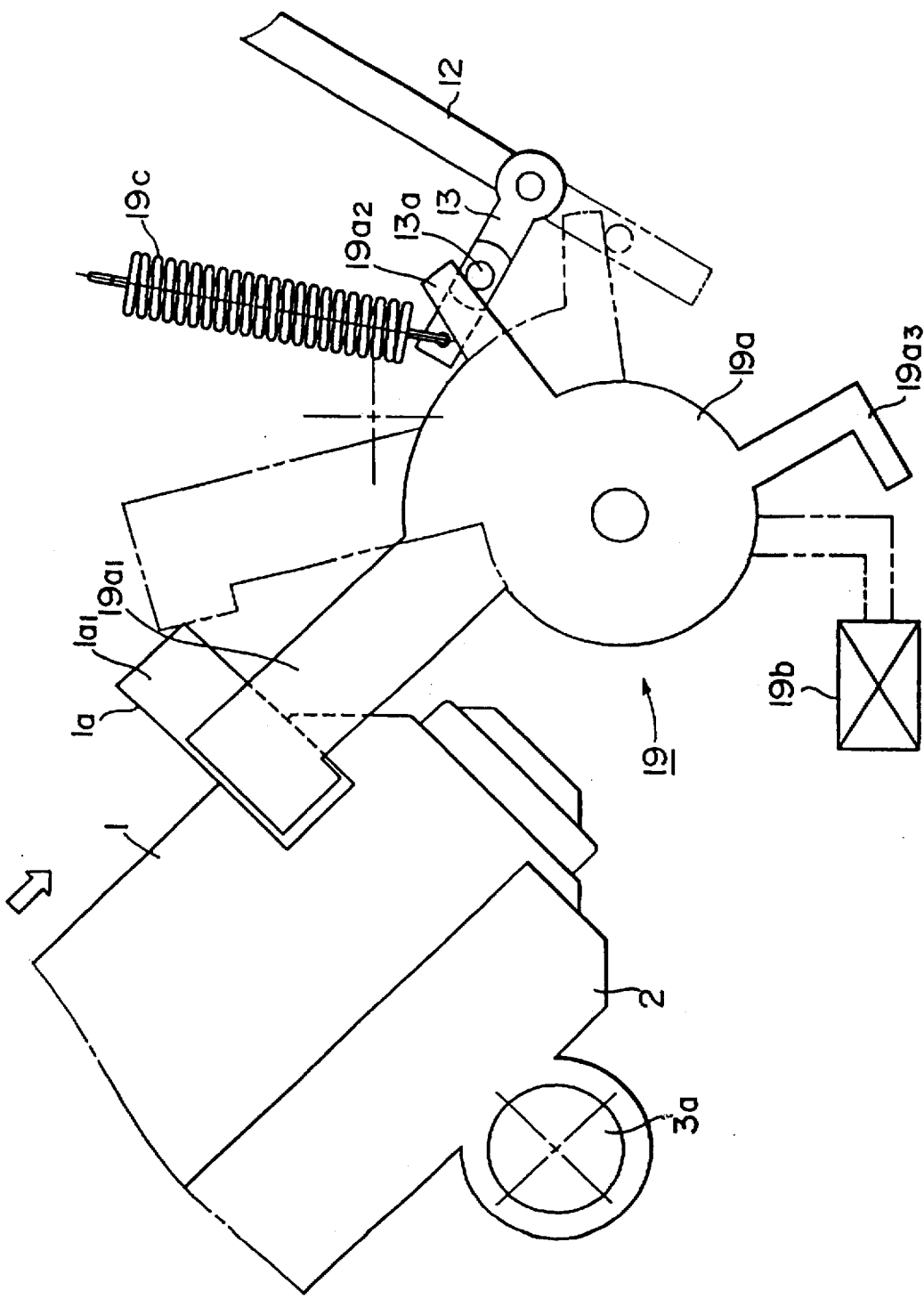
FIG. 15 is an illustration showing another mechanism for opening and shutting a bottom plate of the first embodiment.
Figure 16:
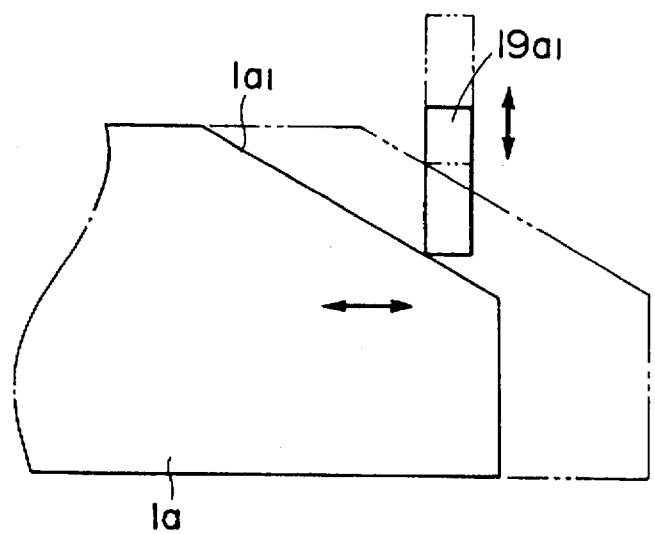
FIG. 16 is an illustration of the mechanism for opening and shutting in FIG. 15 when seen from an arrow direction.

Although in this embodiment, the constitution in which the solenoid electrically turned on and off is used to open and shut the bottom plate 13 of the first holding tray 12 as a mechanism for opening and shutting the bottom plate 13 is exemplified, otherwise, for example as shown in FIGS. 15, 16, a mechanism in which the bottom plate 13 is to be opened and shut by using motions of the carriage in the main scanning direction, might be useful.

As shown in FIG. 15, a mechanism 19 for opening and shutting the bottom plate 13 of the holding tray 12 includes a rotary lever 19a having three arm members 19a1, 19a2, 19a3, a latch 19b fixing and releasing the rotary lever 19a, and a spring 19c pulling the bottom plate 13 toward its closing position. The arm member 19a1 of the rotary lever 19a slidably engages a guide member 1a having an inclined face 1a1 formed on the top of the recording head 1 (see, FIG. 16); the arm member 19a2 engages a boss 13a of the bottom plate 13; the arm member 19a3 engages the latch 19b.

According to the mechanism 19 for opening and shutting thus constituted, by motions of the carriage 2 mounting the recording head 1 thereon in the main scanning direction out of the area where the head can record, the arm member 19a1 of the rotary lever 19a is pushed up along the inclined face 1a1 of the guide member 1a, and concurrently, the arm member 19a2 pushes the boss 13a of the bottom plate 13 down, thereby opening the bottom plate 13 in opposition to force of the spring 19c. The latch 19b at that time fixes the arm member 19a3, thereby holding the rotary lever 19 at a double dotted chain line position shown in FIG. 15. The latch 19b is released by pushing up the arm member 19a1 of the rotary lever 19 once again at the inclined face 1a1 of the guide member 1a, so that the bottom plate 13 is shut by recoiling force of the spring 19c.

Second Embodiment

Referring to the drawings, a second embodiment of the recording apparatus to which the invention applies is described as follows. The identical reference numbers are given to parts or portions having equivalent functions and constitution as those in the embodiment described above, and a detailed description is omitted.

Figure 17:
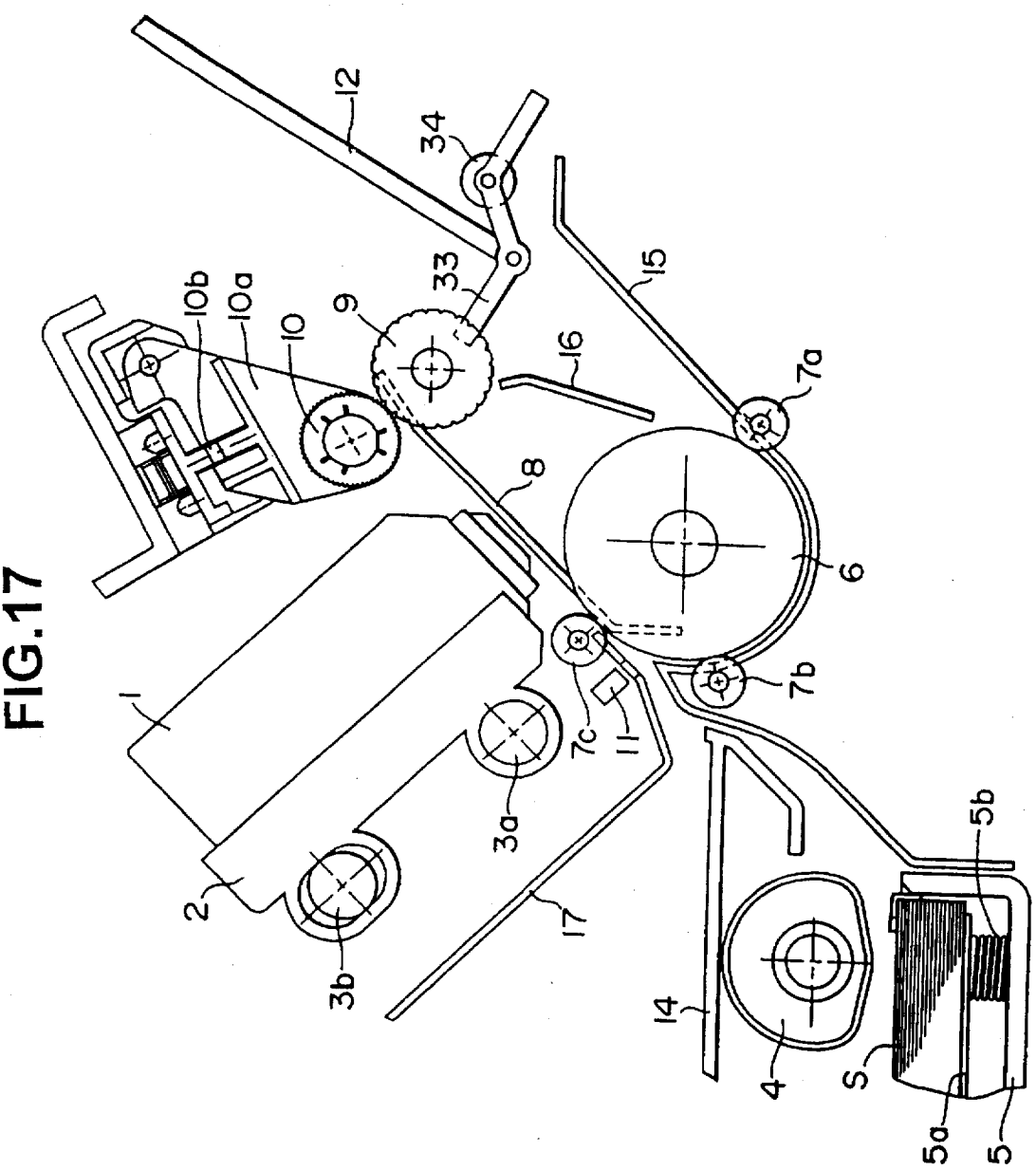
FIG. 17 is a cross-sectional diagram showing schematic constitution of a recording apparatus of a second embodiment.

FIG. 17 is a cross-sectional diagram showing a schematic example of a serial type recording apparatus according to the second embodiment of the invention. As shown in FIG. 17, constitution of the holding tray is different between the recording apparatus of this embodiment and the recording apparatus of the embodiment described above (see, FIG. 1). That is, the holding tray 12 according to this embodiment is equipped with a rotatable bottom plate 33 having a dependent roller 34 rotationally driven by contacting the discharge roller 9. A mechanism to rotate the bottom plate 33 can be a mechanism using a solenoid electrically turned on and off as described above (see, FIG. 2) or a mechanism using motions of the carriage in the main scanning direction (see, FIGS. 15, 16).

Figure 18:
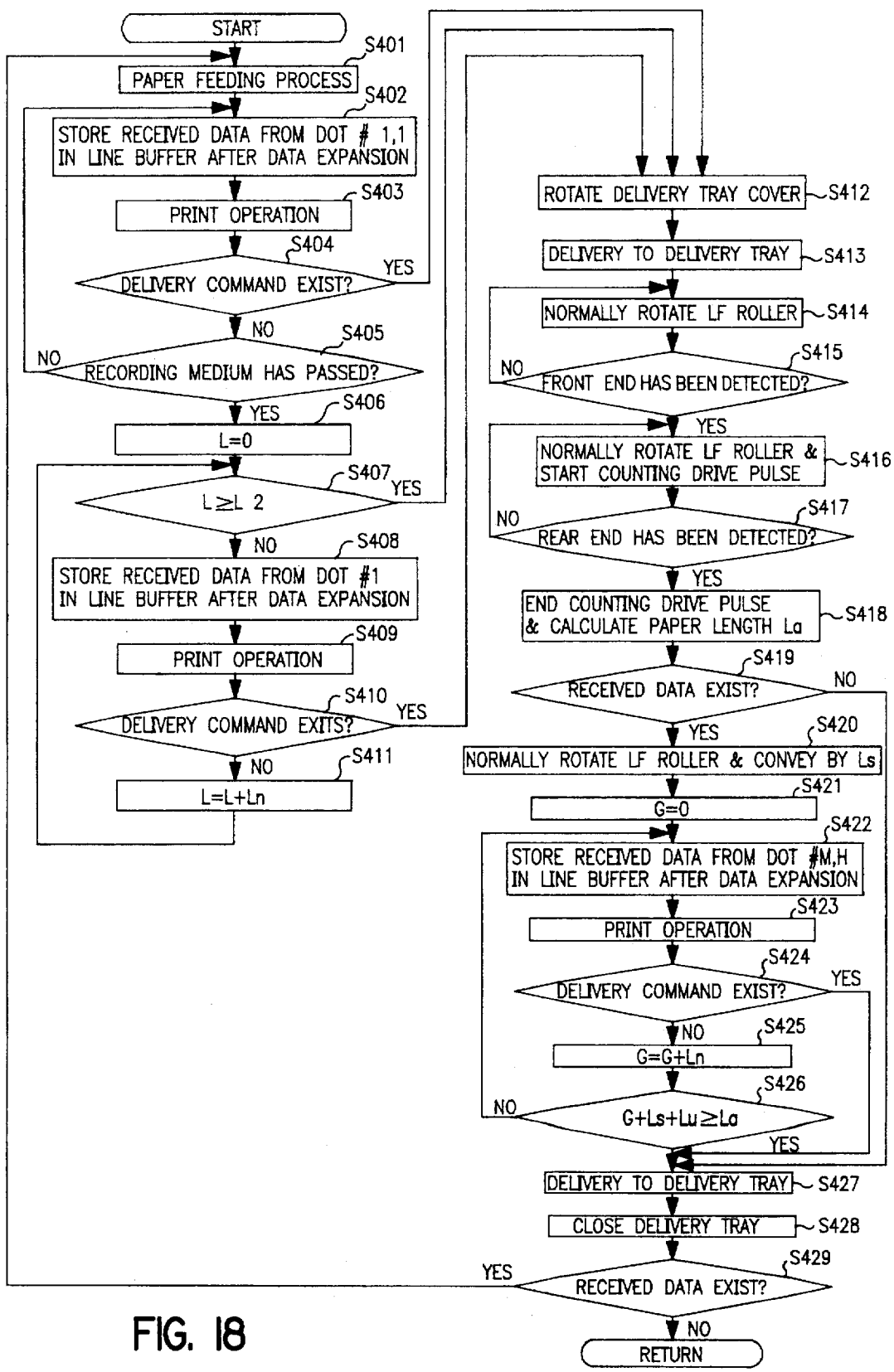
FIG. 18 is a flow chart showing a flow of operations at a time of a double side recording mode of the second embodiment.
Figure 19:
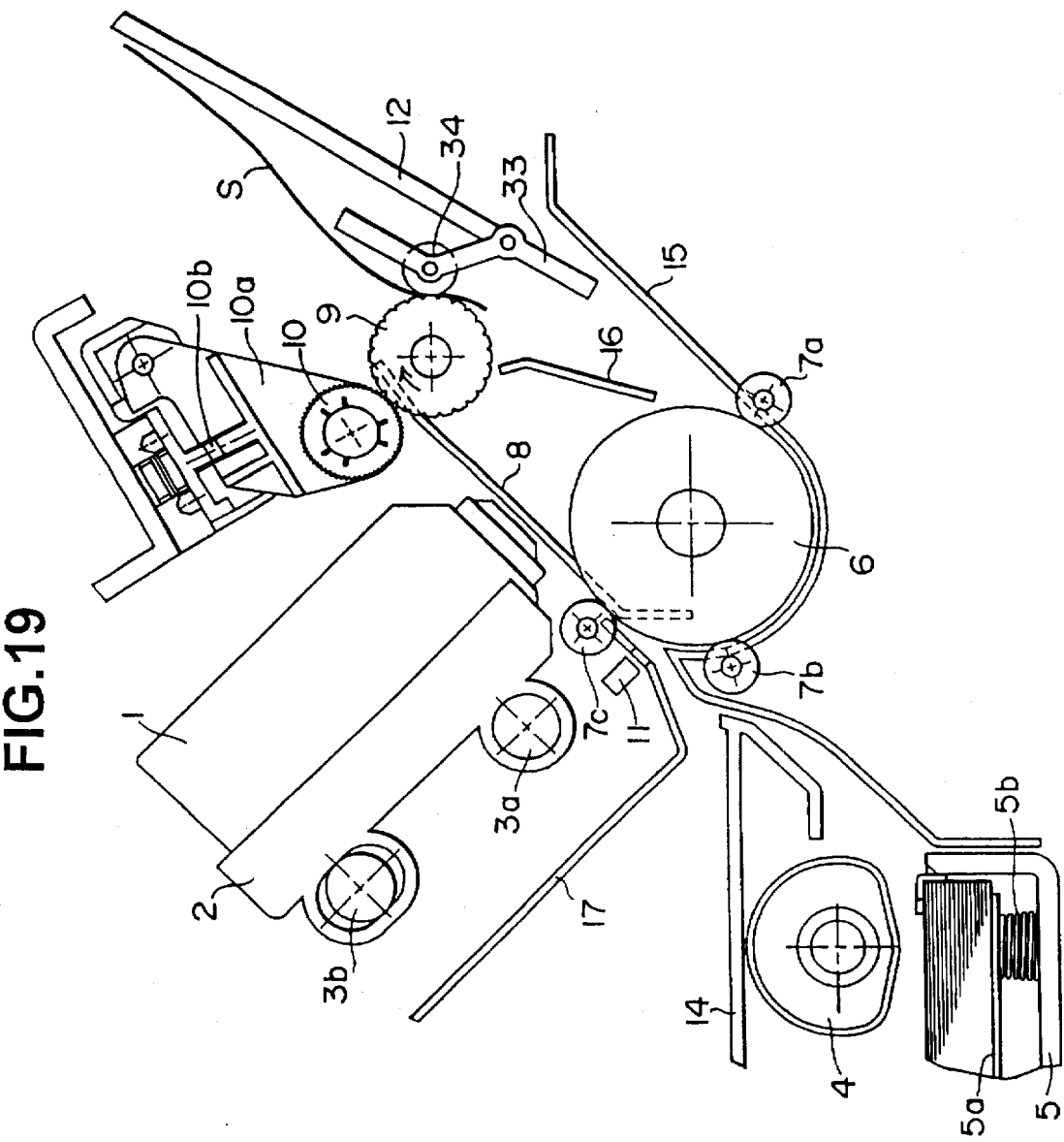
FIG. 19 is a cross-sectional diagram of the recording apparatus, showing a situation that a dependent roller of a rotatable bottom plate contacts with pressure to a discharge roller of the second embodiment.

Hereinafter, with reference to the drawings, there describes control operation at the time of a double side recording mode of the recording apparatus according to this embodiment. FIG. 18 is a flow chair showing a flow of operations at a time of a double side recording mode; FIG. 19 is a cross-sectional diagram of the recording apparatus, showing a situation that a recording sheet on one side of which recording has been made is being re-supplied.

In FIG. 18, upon a reception of the recording signal from the host computer, the LF motor 30 normally drives to rotate the feeding roller 4, thereby picking up sheet by sheet the recording sheet S on a supplying stacker 5 and feeds it separately. The recording sheet S is conveyed by the conveying roller 6 and the dependent roller 7c to the recording position and is set thereat (S401).

After the received data are expanded as the recording data, they are stored in the line buffer equivalent to that of the embodiment above (S402). At step S403, predetermined recording operation is implemented. This recording operation is equivalent to the operation described in the embodiment above using FIG. 6, and here, its description is omitted. In FIG. 18, recording operations at steps S409, S423 are equivalent to those of the first embodiment.

The processes at steps S402, S403 are repeated until the sheet sensor 11 detects the rear end of the recording sheet S. If the host computer 26 provides a command for delivery during the repeat, the process goes to step S412 (S404). Processes similar to those at steps S402, S403 are repeated from the detection of the rear end of the recording sheet S by the sheet sensor 11 (S405) to the time when a sheet conveyance amount L in the sub scanning direction exceeds a predetermined amount L2 (S408, S409). If the conveyance amount L is equal to or greater than the predetermined value L2, the process goes to step S412 (S407).

The bottom plate 33 of the holding tray 12 is rotated so as to contact a dependent roller 34 with the discharge roller 9 (S412), and the LF motor 30 is driven normally to rotate the discharge roller 9 in the normal rotational direction (S413). The recording sheet S is nipped by the discharge roller 9 and the dependent roller 34 after released toward a direction of the holding tray 12 and then conveyed toward the conveying roller 6 (see, FIG. 19). The recording sheet S then reaches the contact point of the conveying roller 6 and the dependent roller 7a while the lower end thereof is guided with the guide plates 15, 16.

Continuously, the LF motor 30 is normally driven to rotate the conveying roller 6 normally, thereby conveying the recording sheet S on one side of which recording has been made (S414). When the sheet sensor 11 detects the front end of the recording sheet S (the rear end when the one side recording is performed), the number of drive pulses of the conveying roller 6 is counted until the rear end (the front end when the one side recording is performed) is detected to calculate a length La in the sub scanning direction of the recording sheet S (S416 to S418). After the calculation for the length La of the recording sheet finishes, the process goes to step S427 if no received data from the host computer 26 exists (S419).

If the received data exist, the LF motor 30 is normally driven to normally rotate the conveying roller 6, thereby conveying the recording sheet S by a predetermined amount Ls, setting the sheet at a recording commencement position for the other side (S420). The predetermined amount Ls is a shorter distance than the distance between the sheet sensor 11 and the contact point of the conveying roller 6 and the dependent roller 7c.

After the received data are expanded as the recording data, the serial recording data in the line buffer memory are set in a reverse manner in comparison with the case when recording on one side is made, as well as the first embodiment (S422). The LF motor 30 is then reversely driven to rotate the conveying roller 6 reversely, thereby conveying the recording sheet S and thereby beginning recording operation by the recording head. Operations at steps S422 to S425 are repeated until the total of a conveyance amount G in the sub scanning direction and of preset front end margin Ls and rear end margin Lu exceeds the previously calculated length La of the recording sheet S.

When the total of the conveyance amount G, the preset front end margin Ls, and the present rear end margin Lu is equal to or exceeds the previously calculated length La of the recording sheet S (S426), the LF motor 30 is reversely driven to reverse the conveying roller 6, thereby delivering onto the discharging tray 14 the recording sheet S on both sides of which recording is made (S427). Then, the bottom plate 33 of the holding tray 12 is rotated to separate the dependent roller 34 from the discharge roller 9, thereby returning the bottom plate 33 to be in the original condition as shown in FIG. 17 (S428). If the received data still exist, the process returns to the step S401 and repeats the routine up to S429 in the same manner.

It is to be noted that the recording apparatus can be constituted so to perform a registration operation such that, using a one way clutch such as a spring clutch for transmission of drive to the discharge roller 9, the conveying roller 6 is reversed to put out the front end of the recording sheet S after the recording sheet S is nipped by the conveying roller 6 and the dependent roller 7a between steps of S413 and S414, and then after the recording sheet S is made to loose its tension between the conveying roller 6 and the discharge roller 9, the conveying roller 6 is again rotated normally. Moreover, providing a drive motor for driving the discharge roller 9 and a drive motor for driving the conveying roller 6, separately, the recording apparatus can be constituted so as to perform the registration operation above.

In the case of the ordinary recording mode (one side recording mode), the bottom plate 33 of the holding tray 12 is used while kept close (a condition shown in FIG. 17) as well as the first embodiment. Selection of the recording modes is done using the control panel 32.

Other Embodiments

Figure 20:
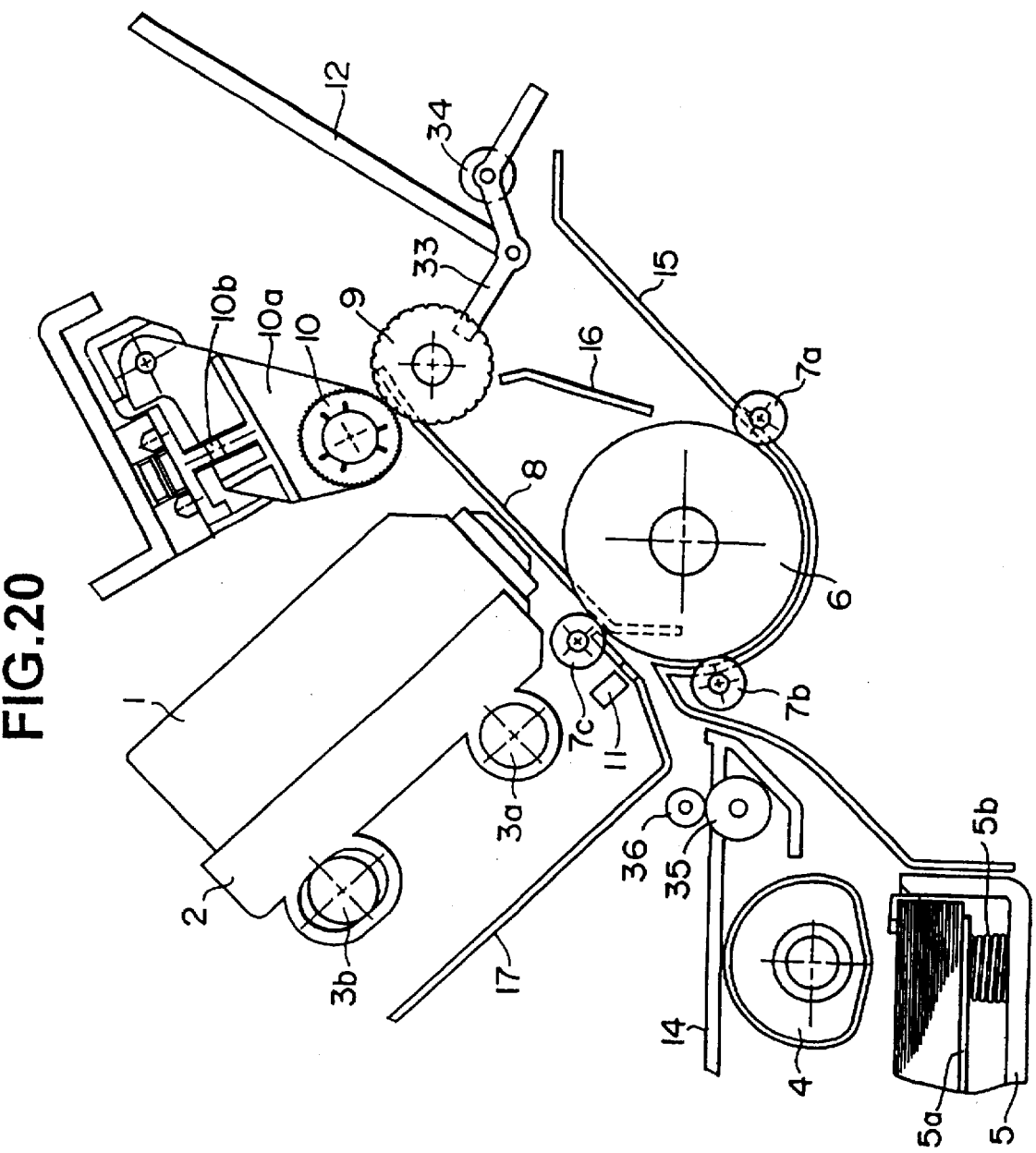
FIG. 20 is a cross-sectional diagram showing an example that a conveying roller pair for delivery is arranged between a conveying roller and a second discharging tray of the second embodiment.
Figure 21:
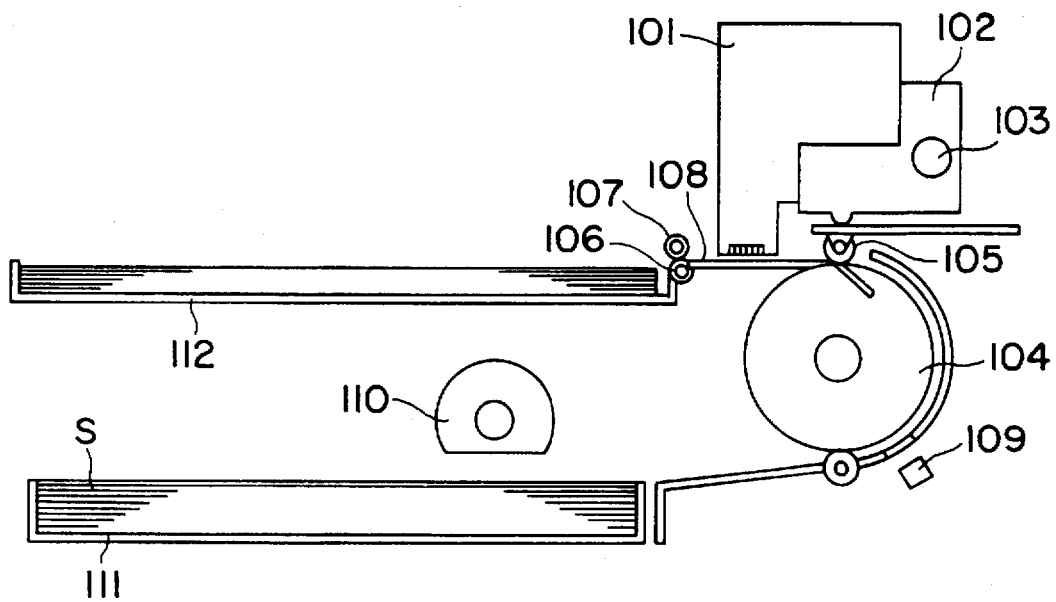
FIG. 21 is a cross-sectional diagram showing schematic constitution of a conventional recording apparatus.
Figure 22:
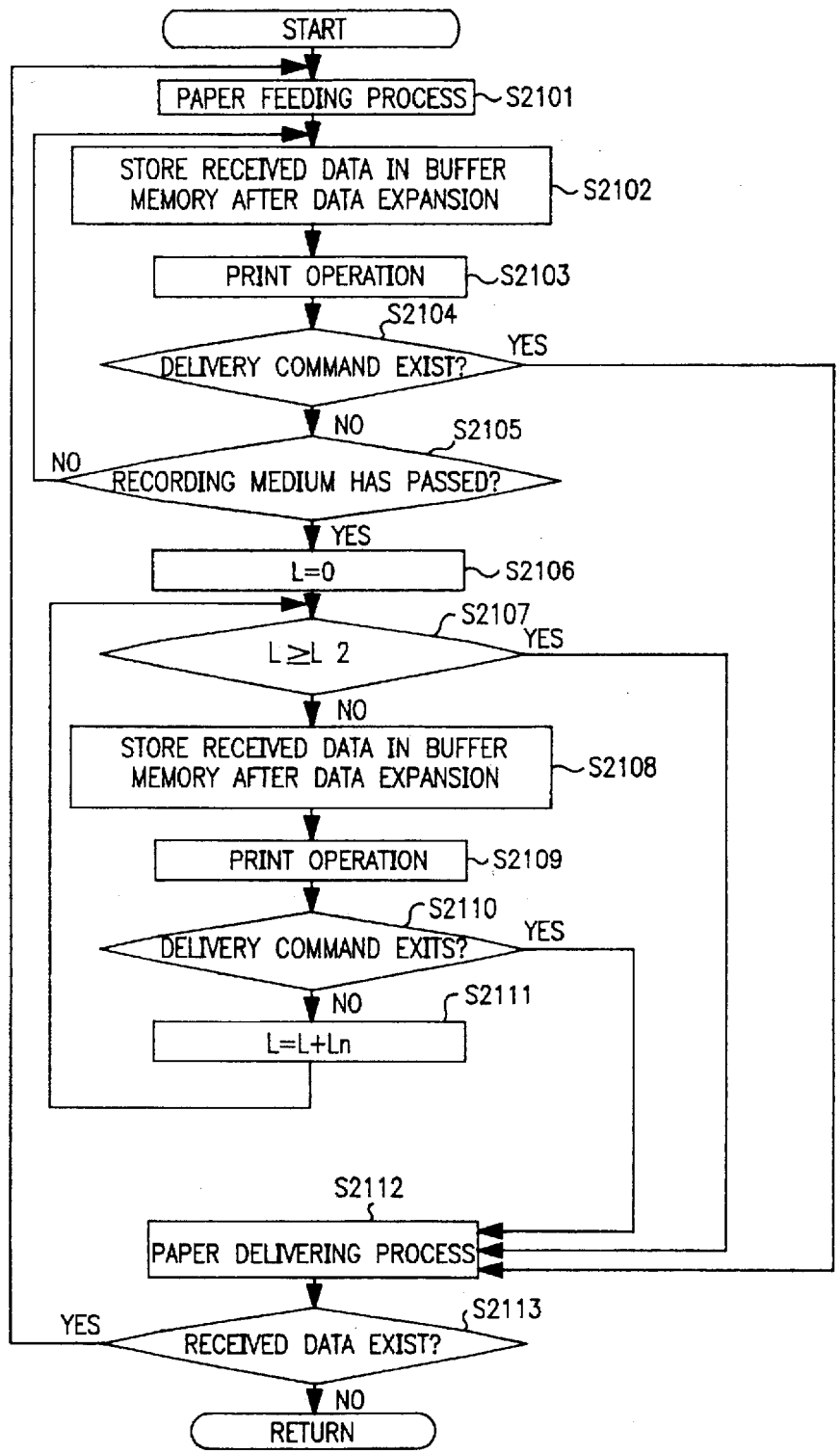
FIG. 22 is a flow chart showing process operations of a control system of the conventional recording apparatus.

Although in the embodiments above, the recording sheet on both side of which recording has been made is delivered onto the discharging tray 14 by the conveying roller 6 and the dependent roller 7c, this invention is not limited to this constitution, and for example, as shown in FIG. 20, the recording apparatus can be constituted to have a conveying roller 35 for delivery as third conveying means and a dependent roller 36 rotationally driven by contacting the conveying roller 35 with pressure, between the conveying roller 6 and the discharging tray 14. This constitution allows the delivery angle of the discharging tray 14 to be designed more freely.

It is to be noted that although in the embodiments above the recording means uses the ink jet recording method, it would be further preferable if constituted by energizing an electrothermal converter in accordance with recording signals and by recording by discharging ink out of the ink outlet in accordance with bubbles growth and contraction occurring to the ink in use of film boiling occurring to the ink by means of thermal energy given from the electrothermal converter.

As representative constitution and principle, one performing in use of basic principle disclosed such as in specifications in U.S. Pat. No. 4,723,129 and U.S. Pat. No. 4,740,796 would be preferable. This method can apply to any of so called On-Demand type and Continuous type. Specifically, in the case of the On-Demand type, it is effective because, by applying at least one drive signal which corresponds to the recording information and which provides rapid temperature increasing as exceeding nucleate boiling, thermal energy is made to occur at the electrothermal converter to produce film boiling on a thermal operation face of the recording head and, consequently, to form bubbles in the liquid corresponding to the drive signals one by one. Bubbles growth and contraction discharges liquid through the opening for discharging and forms at least one droplet. If the drive signal is formed in a pulse shape, excellent discharge of liquid can be achieved and it is more preferable, since bubbles growth and contraction is properly performed immediately.

As drive signal in a pulse shape, one such as described in specifications in U.S. Pat. No. 4,463,359 and U.S. Pat. No. 4,345,262 is suitable. If the condition described in the specification in U.S. Pat. No. 4,313,124 for an invention relating to an increasing rate of temperature of the thermal operation face is adapted, more excellent recording can be performed.

As constitution of the recording head, in addition to the constitutions (straight liquid passage or right angle liquid passage) combined of the outlet, liquid passage, and the electrothermal converter as disclosed in the respective specifications above, the constitution using the specifications of U.S. Patent Publication No. 4,558,333 and U.S. Pat No. 4,459,600, which disclose the constitution in which the thermal operation portion is disposed to a curving area, is included in this invention.

The effect of the invention would be effective for plural electrothermal converters even if it is constituted based on Japanese laid-open Shouwa No. 59-123,670 (patent) in which a common slit is used as the discharge outlet of the electrothermal converter or Japanese laid-open Shouwa No. 59-138,461 (patent) in which openings absorbing pressure wave of thermal energy are corresponded to the discharging portions. That is, however the recording head is designed, according to the invention, recording can be done certainly and effectively.

This invention is further applicable to a full line type recording head having length corresponding to the maximum width of the recording media on which the recording apparatus can record. Such a recording head can be constituted by any of a combination of plural recording heads which satisfy the length and a single recording head unitedly formed.

In addition, among the recording heads of the serial type described above, a recording head fixed to the carriage, a replaceable recording head of a chip type that allows electrical connections with the apparatus body and ink supply from the apparatus body by being attached to the carriage, a recording head of a cartridge type in which an ink tank is arranged in a united body with the recording head itself, or the like can be used.

It is preferable to add such as restoring means for recording heads and preliminary supplemental means, given as constitution of the recording apparatus of the invention, because they can make the effects of the invention more stable. If they are exemplified specifically, capping means against the recording heads, cleaning means, pressure or absorbing means, preheating means made of heating elements of electrothermal converter or else or their combination, and performing preliminary discharge mode for discharging as different from recording are effective for stable recording.

As for kinds and number of the recording heads mounted on the carriage, in addition to one in which only one recording head is arranged corresponding to a monochrome ink, for example, they can be provided in a plural number corresponding to the plural inks having different color and density from one another. That is, for example, it is applicable, as a recording mode of the recording apparatus, not for a recording mode only for main color such as black, but for an apparatus equipped with at least either multicolor made of different colors or full color made of mixed colors, though a recording head unitedly constituted, a combination of plural pieces of heads or whatever may be used.

Furthermore, although in the embodiment described above ink is described as liquid, an ink solidified at room temperature or below and softened or liquefied at room temperature, or one that an ink is liquefied when recording signal for use is applied because in the ink jet recording method it is general to control temperature so that inks viscosity is in a stable range of discharge by adjusting temperature of the ink itself in a range from 30° C. or above to 70° C. or below, can be used. In addition, it is also applicable for one in which the ink is liquefied, in any event, by application of thermal energy according to the recording signals either by preventing temperature from increasing due to thermal energy by positive use as energy for phase change from solid state to liquid state or by using ink that solidified when left as it is for the purpose of prevention of ink evaporation, so that the liquid ink is discharged, and for the case using an ink having nature that nothing except thermal energy makes it liquefy such that when reached the recording sheet the ink already begin to solidify.

Inks for such cases can be formed so as to oppose to the electrothermal converters while held as liquid or solid at recesses of porous sheets or at through holes, as disclosed in Japanese laid-open Shouwa No. 54-56,847 (patent) or No. 60-71,260 (patent). The most effective one against the respective inks described above is to implement the film boiling method described above.

Moreover, a form of the ink jet recording apparatus described above may be, in addition to one used as an image output terminal for an information processing apparatus such as a computer, a photocopier in combination with a reader or the like, one taking a form of a facsimile apparatus having transmission and receiving functions, and the like.

It is to be noted that although the example using the ink jet recording method as recording means described above is described, the recording method of this invention is not necessarily to be limited to the ink jet recording method and is applicable to a thermal transfer recording method, a thermal recording method, any recording method of a wire dot recording method or the like, and a recording method other than above.

What is claimed is:

1. A recording apparatus comprising:
    a carriage for holding recording means for recording on a recording medium;
    a platen positioned opposite to said recording means for supporting said recording medium at a recording area;
    conveying means rotatable for introducing said recording medium into said recording area in forward and reverse conveyance directions;
    a passage introducing said recording medium into said conveying means by rendering a lower end of said recording medium as a front end in a forward conveyance direction; and
    a line buffer memory for temporarily storing serial recording data of one scanning line of said recording means, said recording data being expandable to H stages and M columns,
        wherein in a double side recording mode, said recording means records one side of said recording medium; after making said recording medium pass through said passage and set at a recording commencement position for the other side thereof, said recording medium is conveyed in the forward conveyance direction to render an upper end of said recording medium as a front end in the reverse conveyance direction by rotating said conveying means; and said recording medium is conveyed in the reverse conveyance direction and said recording means records on the other side of said recording medium by transmission from said line buffer memory to said recording means said serial recording reversely permuted so that data at the H stage and the M column constitute data at the first stage and the first column.

2. The recording apparatus as set forth in claim 1, wherein said recording means comprises ink jet recording means that discharges ink to record according to a signal.

3. The recording apparatus as set forth in claim 2, further comprising an electrothermal converter incorporated into said recording means for producing thermal energy for discharging ink.

4. A recording apparatus comprising:
    a carriage for holding recording means for recording on a recording medium;

a platen positioned in opposite to said recording means for supporting said recording medium at a recording area;

conveying means rotatable for introducing said recording medium into said recording area in forward and reverse conveyance directions;

a buffer memory for temporarily storing serial recording data of one scanning line for said recording means until said recording means is finished recording;

a mid-holding member located on a downstream side of said recording means in the forward conveyance direction and equipped with a bottom plate capable of being opened and shut for stacking recording media; and control means for controlling respective drives of said recording means, said conveying means, said carriage, and said mid-holding member, wherein in a double side recording mode, the recording medium, on one side of which said recording means has recorded, is conveyed again to said conveying means through the opened bottom plate of said mid-holding member after being delivered onto said mid-holding member where said bottom plate was shut; said conveying means is normally rotated to set said recording medium at a recording commencement position; said conveying means is then rotated to convey said recording medium to render an upper end of said recording medium as a front end in the reverse conveyance direction; and said recording means records on the other side of said recording medium.

5. The recording apparatus as set forth in claim 4, further comprising a receiving member positioned by a downstream side of said recording means in the reverse conveyance direction for receiving said recording medium after the other side of said recording medium has been recorded.

6. The recording apparatus as set forth in claim 4, wherein said conveying means is reversed a predetermined amount when said recording medium on one side of which recording was made is to be conveyed again to said conveying means.

7. The recording apparatus as set forth in claim 4, wherein said bottom plate of said mid-holding member is controlled to open and shut using a solenoid electrically turned on and off.

8. The recording apparatus as set forth in claim 4, wherein said bottom plate of said mid-holding member is controlled to open and shut in conjunction with the motion of said carriage.

9. The recording apparatus as set forth in claim 4, further comprising detecting means located on an upstream side of said conveying means in the forward conveyance direction for detecting the front and rear ends of said recording medium, wherein the length of said recording medium in the conveyance direction is measured by detection of the front and rear ends of said recording medium by said detecting means when the other side of said recording medium is to be set at said recording position.

10. The recording apparatus as set forth in claim 4, wherein in the case when the other side of said recording medium the one side of which recording has been made, is to be recorded said recording data to be stored in said buffer memory is stored in a manner that the data is reversed by 180 degrees in comparison with ordinary recording for the one side.

11. The recording apparatus as set forth in claim 4, wherein said bottom plate of said mid-holding member is kept shut in the case of an ordinary recording mode that only one side of each recording medium is recorded.

12. The recording apparatus as set forth in claim 5, further comprising delivery conveying means provided between said conveying means and said receiving member.

13. The recording apparatus as set forth in claim 4, wherein said recording means comprises ink jet recording means that discharges ink to record according to a signal.

14. The recording apparatus as set forth in claim 13, further comprising an electrothermal converter incorporated into said recording means for producing thermal energy for discharging ink.

15. A recording apparatus comprising:

a carriage for holding recording means for recording on a recording medium;

a platen positioned opposite to said recording means for supporting said recording medium at a recording area;

conveying means rotatable for introducing said recording medium into said recording area in forward and reverse conveyance directions;

a line buffer memory for temporarily storing serial recording data of one scanning line of said recording means, said recording data being expandable to H stages and M columns;

a mid-holding member located on a downstream side of said recording means in the forward conveyance direction and equipped with a bottom plate capable of being opened and shut for stacking recording media; and control means for controlling respective drives of said recording means, said conveying means, said carriage, and said mid-holding member, wherein in a double side recording mode, the recording medium, on one side of which said recording means has recorded, is conveyed again to said conveying means through the opened bottom plate of said mid-holding member after being delivered onto said mid-holding member where said bottom plate was shut; said conveying means is normally rotated to set said recording medium at a recording commencement position; said conveying means is then rotated to convey said recording medium to render an upper end of said recording medium as a front end in the reverse conveyance direction; and said recording means records on the other side of said recording medium by transmission from said line buffer memory to said recording means said recording data reversely permuted so that data at the H stage and the M column constitute data at the first stage and the first column.

16. The recording apparatus as set forth in claim 15, wherein said recording means comprises an ink jet recording means that discharges ink to record according to a signal.

17. The recording apparatus as set forth in claim 16, further comprising an electrothermal converter incorporated into said recording means for producing thermal energy for discharging ink.

18. A recording apparatus comprising:

a carriage, movable in a main scanning direction perpendicular to forward and reverse conveyance directions of a recording medium, for holding a recording head of an ink jet system arranging plural liquid outlets in a row for discharging ink according to a signal;

a platen positioned opposite to said recording head for supporting said recording medium at a recording area;

conveying means rotatable for introducing said recording medium to said recording area;

a passage introducing said recording medium into said conveying means by rendering a lower end of said recording medium as a front end in the forward conveyance direction; and a line buffer memory for temporarily storing serial recording data of one scanning line of said recording head, said recording data being expandable to H stages corresponding to the number of said liquid outlets of said recording head and M columns corresponding to the number of dots in the main scanning direction, wherein in a double side recording mode, said recording head records one side of said recording medium; said recording medium is conveyed in the forward conveyance direction to render an upper end of said recording medium as a front end in the reverse conveyance direction by rotating said conveying means after said recording medium passes through said passage and is set at a recording commencement position for the other side thereof; and said recording head records on the other side of said recording medium by transmission from said line buffer memory to said recording head said recording data reversely permuted so that data at the H stage and the M column constitute data at the first stage and the first column.

19. The recording apparatus as set forth in claim 18, further comprising an electrothermal converter incorporated into said recording head for producing thermal energy for discharging ink.

20. A recording apparatus comprising:

a carriage for holding a recording head of an ink jet system arranging plural liquid outlets in a row for discharging ink according to a signal;

a platen positioned opposite to said recording head for supporting said recording medium at a recording area;

conveying means rotatable for introducing said recording medium to said recording area in forward and reverse conveyance directions;

a buffer memory for temporarily storing recording data of one scanning line for said recording head until said recording head is finished recording;

a mid-holding member located on a downstream side of said recording head in the forward conveyance direction and equipped with a bottom plate capable of being opened and shut for stacking recording media; and control means for controlling respective drives of said recording head, said conveying means, said carriage, and said mid-holding member, wherein in a double side recording mode, the recording medium, on one side of which said recording head has recorded, is conveyed again to said conveying means through the opened bottom plate of said mid-holding member after being delivered onto said mid-holding member where said bottom plate was shut; said conveying means is normally rotated to set said recording medium at a recording commencement position; said conveying means is then rotated to convey said recording medium to render an upper end of said recording medium as a front end in the reverse conveyance direction; and said recording head records on the other side of said recording medium.

21. The recording apparatus as set forth in claim 20, further comprising an electrothermal converter incorporated into said recording head for producing thermal energy for discharging ink.

22. A recording apparatus comprising:

a carriage, movable in a main scanning direction perpendicular to forward and reverse conveyance directions of a recording medium, for holding a recording head of an ink jet system arranging plural liquid outlets in a row for discharging ink according to a signal;

a platen positioned opposite to said recording head for supporting said recording medium at a recording area;

conveying means rotatable for introducing said recording medium to said recording area;

a line buffer memory for temporarily storing serial recording data of one scanning line of said recording head, said recording data being expandable to H stages corresponding to the number of said liquid outlets of said recording head and M columns corresponding to the number of dots in the main scanning direction, a mid-holding member located on a downstream side of said recording head in the forward conveyance direction and equipped with a bottom plate capable of being opened and shut for stacking recording media; and control means for controlling respective drives of said recording head, said conveying means, said carriage, and said mid-holding member, wherein in a double side recording mode, the recording medium, on one side of which said recording head has recorded, is conveyed again to said conveying means through the opened bottom plate of said mid-holding member after being delivered onto said mid-holding member where said bottom plate was shut; said conveying means is normally rotated to set said recording medium at a recording commencement position; said conveying means is then reversely rotated to convey said recording medium to render an upper end of said recording medium as a front end in the reverse conveyance direction; and said recording head records on the other side of said recording medium by transmission from said line buffer memory to said recording head said recording data reversely permuted so that data at the H stage and the M column constitute data at the first stage and the first column.

23. The recording apparatus as set forth in claim 22, further comprising an electrothermal converter incorporated into said recording head for producing thermal energy for discharging ink.

24. A recording method comprising the steps of:

introducing a recording medium to recording means in a forward conveyance direction by conveying means;

recording on one side of said recording medium by said recording means using serial recording data of one scanning line for said recording means temporarily stored in a line buffer memory, said recording data being expandable to H stages and M columns;

reintroducing said recording medium to said conveying means by rendering a lower end of said recording medium as a front end in the forward conveyance direction by passing through a passage said recording medium, the one side of which has been recorded;

setting said recording medium at a recording commencement position for recording of the other side by normally rotating said conveying means; and recording with said recording means on the other side of said recording medium serial recording data reversely permuted so that data at the H stage and the M column constitute data at the first stage and the first column, by transmitting said data from said line buffer memory to said recording means, where said recording medium has been conveyed by reversely rotating said conveying means so that an upper end of said recording medium is rendered as the front end in a reverse conveyance direction.

25. A recording apparatus comprising:

a carriage for holding recording means for recording on a recording medium;

a platen positioned opposite to said recording means for supporting said recording medium at a recording area;

conveying means rotatable for introducing said recording medium in forward and reverse conveyance directions into said recording area;

a buffer memory for temporarily storing serial recording data of one scanning line for said recording means until said recording means is finished recording;

a mid-holding member, located on a downstream side of said recording means in the forward conveyance direction and comprising a bottom plate capable of being opened and shut for stacking recording media, wherein said bottom plate of said mid-holding member is controlled so as to open and shut in conjunction with motion of said carriage; and control means for controlling respective drives of said recording means, said conveying means, said carriage, and said mid-holding member, wherein in a double side recording mode, the recording medium, the one side of which has been recorded by said recording means, is conveyed again to said conveying means through the opened bottom plate of said mid-holding member after being delivered onto said mid-holding member where said bottom plate was shut; said conveying means is normally rotated to set said recording medium at a recording commencement position; said conveying means is then reversely rotated to convey said recording medium to render an upper end of said recording medium as a front end in the reverse conveyance direction; and said recording means records on the other side of said recording medium.

26. The recording apparatus as set forth in claim 25, further comprising a receiving member positioned at a downstream side of said recording means in the reverse conveyance direction for receiving said recording medium after the other side of said recording medium has been recorded.

27. The recording apparatus as set forth in claim 25, wherein said conveying means is reversed a predetermined amount when said recording medium on one side of which recording was made is to be conveyed again to said conveying means.

28. The recording apparatus as set forth in claim 25, wherein said bottom plate of said mid-holding member is controlled to open and shut using a solenoid electrically turned on and off.

29. The recording apparatus as set forth in claim 25, wherein in the case when the other side of said recording medium, on the one side of which recording has been made, is to be recorded said recording data to be stored in said buffer memory is stored in a manner that the data is reversed by 180 degrees in comparison with ordinary recording for the one side.

30. The recording apparatus as set forth in claim 25, wherein said bottom plate of said mid-holding member is kept shut in the case of an ordinary recording mode that only one side of each recording medium is recorded.

31. The recording apparatus as set forth in claim 26, further comprising a delivery conveying means provided between said conveying means and said receiving member.

32. The recording apparatus as set forth in claim 25, wherein said recording means comprises ink jet recording means that discharges ink to record according to a signal.

33. The recording apparatus as set forth in claim 32, further comprising an electrothermal converter incorporated into said recording means for producing thermal energy for discharging ink.

* * * * *